(12) United States Patent
Zarifi et al.

(10) Patent No.: US 11,096,065 B2
(45) Date of Patent: Aug. 17, 2021

(54) APPARATUS AND METHOD FOR PROVIDING ENHANCED WIRELESS COVERAGE, IMPROVED SERVICE PERFORMANCE, AND REDUCED BATTERY POWER CONSUMPTION

(71) Applicant: Huawei Technologies Co., Ltd., Shenzhen (CN)

(72) Inventors: Keyvan Zarifi, Ottawa (CA); Mohammadhadi Baligh, Ottawa (CA); Jianglei Ma, Ottawa (CA); Peiying Zhu, Kanata (CA); Amine Maaref, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/686,583

(22) Filed: Nov. 18, 2019

(65) Prior Publication Data
US 2020/0084640 A1    Mar. 12, 2020

Related U.S. Application Data

(63) Continuation of application No. 14/562,089, filed on Dec. 5, 2014, now Pat. No. 10,484,883.
(Continued)

(51) Int. Cl.
*H04W 40/00*    (2009.01)
*H04W 16/26*    (2009.01)
(Continued)

(52) U.S. Cl.
CPC ........ *H04W 16/26* (2013.01); *H04B 7/15507* (2013.01); *H04W 88/04* (2013.01); *Y02D 30/70* (2020.08)

(58) Field of Classification Search
CPC ..... H04W 16/26; H04W 88/04; H04W 8/245; H04B 7/15507; H04B 88/02; Y02D 30/70; H04M 1/72519; H04M 1/72522
(Continued)

(56) References Cited

U.S. PATENT DOCUMENTS 8,600,295 B2    12/2013  Rappaport
9,572,148 B2 *   2/2017  Park ...................... H04L 5/0053
(Continued)

FOREIGN PATENT DOCUMENTS

CN    102067716       5/2011
EP       1729533 A1   12/2006
(Continued)

*Primary Examiner* — Danh C Le
(74) *Attorney, Agent, or Firm* — Slater Matsil, LLP

(57) ABSTRACT

Embodiments of the invention describe a novel solution to enhance network service to devices with limited or no connectivity. Embodiments include network-aware nodes deployed by an end-user or operator which are configured by a network to achieve enhanced coverage, enhanced throughput, enhanced battery life, and mitigation of cell boundary experiences, etc. Embodiments provide these benefits to a specified or non-specified set of user equipment (e.g., neighboring user equipment). The service expansion terminal can be an available user equipment that is idle and that has been volunteered, assigned, or is a dedicated node with limited user interface and designed for carrying out enhanced coverage, enhanced throughput, enhanced battery life, and the mitigation of cell boundary experiences, etc. Embodiments may therefore provide low-cost, flexible deployment, and mobility thereby enabling boundaryless service.

20 Claims, 17 Drawing Sheets

Related U.S. Application Data

(60) Provisional application No. 61/912,396, filed on Dec. 5, 2013.

(51) Int. Cl.
*H04B 7/155* (2006.01)
*H04W 88/04* (2009.01)

(58) Field of Classification Search
USPC ........... 455/446, 41.2, 550.1, 435.1; 370/328
See application file for complete search history.

(56) References Cited

U.S. PATENT DOCUMENTS

| | | | | |
|---|---|---|---|---|
| 9,769,857 | B2* | 9/2017 | Sartori | H04W 76/14 |
| 9,788,262 | B2* | 10/2017 | Tietz | H04W 4/029 |
| 9,894,697 | B2* | 2/2018 | Ayadurai | H04W 24/08 |
| 10,136,442 | B2* | 11/2018 | Byun | H04L 5/0037 |
| 2006/0252416 | A1 | 11/2006 | Du et al. | |
| 2008/0031197 | A1 | 2/2008 | Wang et al. | |
| 2008/0107091 | A1 | 5/2008 | Ramachandran | |
| 2009/0034498 | A1 | 2/2009 | Banerjea et al. | |
| 2009/0088164 | A1 | 4/2009 | Shen et al. | |
| 2010/0227620 | A1 | 9/2010 | Naden et al. | |
| 2010/0272009 | A1 | 10/2010 | Cheng et al. | |
| 2010/0279647 | A1 | 11/2010 | Jacobs et al. | |
| 2011/0019991 | A1 | 1/2011 | Lee et al. | |
| 2011/0032879 | A1 | 2/2011 | Beaudin et al. | |
| 2011/0134826 | A1 | 6/2011 | Yang et al. | |
| 2011/0134827 | A1 | 6/2011 | Hooli et al. | |
| 2011/0199919 | A1 | 8/2011 | Lin et al. | |
| 2012/0028627 | A1 | 2/2012 | Hunzinger | |
| 2012/0159279 | A1 | 6/2012 | Braithwaite | |
| 2012/0189082 | A1* | 7/2012 | Zhang | H04L 1/0031 375/299 |
| 2012/0213061 | A1* | 8/2012 | Chen | H04W 16/14 370/227 |
| 2012/0315841 | A1 | 12/2012 | Zhou et al. | |
| 2013/0039324 | A1 | 2/2013 | Kwon et al. | |
| 2013/0079040 | A1 | 3/2013 | Charbit et al. | |
| 2013/0184024 | A1* | 7/2013 | Chen | H04W 76/14 455/509 |
| 2013/0242853 | A1 | 9/2013 | Seo et al. | |
| 2013/0288668 | A1* | 10/2013 | Pragada | H04M 15/8033 455/426.1 |
| 2013/0294327 | A1 | 11/2013 | Horn et al. | |
| 2013/0316727 | A1 | 11/2013 | Edge | |
| 2014/0094121 | A1* | 4/2014 | Ben-Shalom | H04L 63/164 455/41.2 |
| 2014/0133387 | A1* | 5/2014 | Wagner | H04B 7/15 370/315 |
| 2014/0146739 | A1 | 5/2014 | Zhang et al. | |
| 2014/0171062 | A1 | 6/2014 | Fallgren et al. | |
| 2014/0171091 | A1 | 6/2014 | Cai et al. | |
| 2014/0198712 | A1 | 7/2014 | Howard | |
| 2014/0302850 | A1 | 10/2014 | Young et al. | |
| 2014/0341109 | A1* | 11/2014 | Cartmell | H04L 43/50 370/328 |
| 2015/0031353 | A1 | 1/2015 | Hakola et al. | |
| 2015/0052580 | A1* | 2/2015 | Delsol | H04L 63/062 726/3 |
| 2015/0223284 | A1* | 8/2015 | Jain | H04L 5/0057 370/329 |
| 2015/0237555 | A1* | 8/2015 | Kashiwase | H04W 40/22 370/329 |
| 2015/0373616 | A1 | 12/2015 | Fujishiro | |
| 2015/0373737 | A1* | 12/2015 | Park | H04W 72/0406 370/329 |
| 2016/0157273 | A1 | 6/2016 | Ljung | |
| 2016/0294513 | A1* | 10/2016 | Wager | H04B 7/15 |
| 2017/0273121 | A1 | 9/2017 | Tong et al. | |

FOREIGN PATENT DOCUMENTS

| | | |
|---|---|---|
| JP | 2001244928 A | 9/2001 |
| JP | 2006522543 A | 9/2006 |
| JP | 2010535461 A | 11/2010 |
| JP | 2011521517 A | 7/2011 |
| JP | 2014522601 A | 9/2014 |
| WO | 2012068294 A1 | 5/2012 |
| WO | 2012166969 A1 | 12/2012 |
| WO | 2014051126 A1 | 4/2014 |
| WO | 2014184600 A1 | 11/2014 |

* cited by examiner

800

```
┌─────────────────────────┐
│ Configuring A Setting   │
│ Associated With Acting As│
│   A Service Enhancers   │
│           802           │
└───────────┬─────────────┘
            ▼
┌─────────────────────────┐
│ Sending An Indication Of│
│ Being Operable To Act As│
│    Service Enhancer     │
│           804           │
└───────────┬─────────────┘
            ▼
┌─────────────────────────┐
│   Receiving A Request To│
│     Act As A Service    │
│         Enhancer        │
│           806           │
└───────────┬─────────────┘
            ▼
┌─────────────────────────┐
│   Sending Availability  │
│       Information       │
│           808           │
└───────────┬─────────────┘
            ▼
┌─────────────────────────┐
│   Receiving Testing Data│
│           810           │
└───────────┬─────────────┘
            ▼
┌─────────────────────────┐
│   Responding To Testing │
│           Data          │
│           812           │
└───────────┬─────────────┘
            │
            ▼
┌─────────────────────────┐
│       Receiving An      │
│     Acknowledgement     │
│           814           │
└───────────┬─────────────┘
            ▼
┌─────────────────────────┐
│   Sending Information   │
│     Associated With A   │
│    Neighboring Device   │
│           816           │
└───────────┬─────────────┘
            ▼
┌─────────────────────────┐
│  Receiving Configuration│
│       Information       │
│           818           │
└───────────┬─────────────┘
            ▼
┌─────────────────────────┐
│   Setting Up Service    │
│ Enhancer And Client Links│
│           820           │
└───────────┬─────────────┘
            ▼
┌─────────────────────────┐
│   Sending Information   │
│     Associated With The │
│   Service Enhancer And  │
│       Client Links      │
│           822           │
└───────────┬─────────────┘
            ▼
┌─────────────────────────┐
│   Communicating Data    │
│           824           │
└─────────────────────────┘
```

FIGURE 8

APPARATUS AND METHOD FOR PROVIDING ENHANCED WIRELESS COVERAGE, IMPROVED SERVICE PERFORMANCE, AND REDUCED BATTERY POWER CONSUMPTION

CROSS-REFERENCE TO RELATED APPLICATIONS

This application is a continuation of U.S. patent application Ser. No. 14/562,089, entitled "Apparatus and Method for Providing Enhanced Wireless Coverage, Improved Service Performance, and Reduced Battery Power Consumption," filed on Dec. 5, 2014, which claims the benefit of and priority to the U.S. Provisional Patent Application No. 61/912,396, entitled "Dummy User Equipment (DUE) Solution to Ubiquitous Service in 5G Networks," filed on Dec. 5, 2013, which applications are hereby incorporated by reference in their entireties.

TECHNICAL FIELD

Embodiments of the present invention relate to communication networks and in particular to wireless communication networks.

BACKGROUND

With the ongoing rise in wireless network use and mobile device use, increased reliance on wireless networks and mobile devices has driven demand for better coverage and increased network throughput. Throughput is related to the signal strength and coverage of the wireless network. As such, devices receiving low signal strength (or those devices located at or beyond the edge of the network) often experience limited or no network service. Conventionally, network coverage is extended by adding more base stations. However, adding more base stations is costly in terms of both capital expenditures as well as operational expenditures. There are other problems with merely adding base stations as the coverage solution. For instance, adding base stations takes time to deploy. In addition, it may not be economical to add a base station until there are enough end users to justify the investment. Base stations are also not suitable to be deployed for temporary uses, such as for a meeting, public event, sporting event, etc. Indeed, today's mobile users are constantly on the move and coverage is an issue when driving a car, riding a train, or riding on a bus. Another problem associated with coverage is that the wireless signals may not be strong enough to reach certain spots due to interference or being blocked by a physical object.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments include providing network-aware nodes deployed by an end-user or operator which are configured by a network to achieve enhanced coverage, enhanced throughput, enhanced battery life, and mitigation of cell boundary experiences. The novel node may be one that is an available user equipment that is idle and that has been volunteered or assigned. Alternatively, the novel node may be a dedicated node. Embodiments may therefore provide a low-cost solution, offering flexible deployment, and mobility thereby enabling "boundaryless" service (e.g., 5G networks).

In general, a service enhancing device is provided for enhancing service to one or more devices that are in close proximity to the service enhancing device. In one embodiment of the present invention, standard cell phones are used to function as the service enhancing device. The service enhancing device is configured to receive data intended for a client device and originating from a base station. In order to provide the enhanced coverage, the signal strength of the communication link between the client device and the service enhancing device is greater than the signal strength of the communication link that is between the client device and the base station. In addition to transmitting the data, the service enhancing device also transmits control signals generated by the base station directly to the client device. In contrast to relays and boosters, the service enhancing device does not generate its own control signals.

More specifically, one embodiment of the present invention is directed to a device operable to communicate with a client device over a first communication link, the device comprising: a processor; a memory coupled to the processor; a logic unit coupled to the processor; and a transmitter and a receiver coupled to the processor, wherein the receiver is configured to receive data for a client device originating from a base station when the device is proximately located to the client device, wherein a signal strength of the first communication link is greater than a signal strength of a second communication link between the client device and the base station, and wherein the transmitter is configured to transmit control signals generated by the base station to the client device, and wherein further the transmitter and receiver are further configured to extend wireless service connectivity to the client by sending and receiving data between the client device and the base station.

Another embodiment of the present invention is directed to a method for enhancing network service, the method comprising: receiving data for a client device from a base station at a communication device using a first transmission scheme, wherein the client device is subscribed to the base station and wherein said communication device is a mobile electronic device that is determined to be idle; processing the data for transmission to the client using a second transmission scheme; and sending the data to the client based on the second transmission scheme, wherein the client device is proximately located relative to the communication device, and wherein the communication device is configured to communicate data to the client device in conjunction with the base station, and wherein the communication device is configured to provide enhanced wireless coverage to the client device over that provided by the base station.

Another embodiment of the present invention is directed to a mobile device comprising: a processor; a transmitter and a receiver coupled to the processor and operable for communicating with a component of a communications network and a plurality of terminal devices; and a memory coupled to the processor and having stored therein instructions that, when executed, cause the device to perform a method comprising: identifying a subset of terminal devices of the plurality of terminal devices wherein the subset are proximately located to the device, wherein the transmitter and receiver send and receive data at a higher rate within the communication network than the subset of terminal devices; forming a collaborative group comprising the device and the subset of terminal devices; and establishing communication links between the communication network and the collaborative group.

BRIEF DESCRIPTION OF THE DRAWINGS

The accompanying drawings are incorporated in and form a part of this specification. The drawings illustrate embodiments. Together with the description, the drawings serve to explain the principles of the embodiments:

FIG. 8 shows an exemplary setup process of a device volunteered to function as a service enhancer device, in accordance with embodiments of the present invention.

DETAILED DESCRIPTION OF ILLUSTRATIVE EMBODIMENTS

Figure 1:
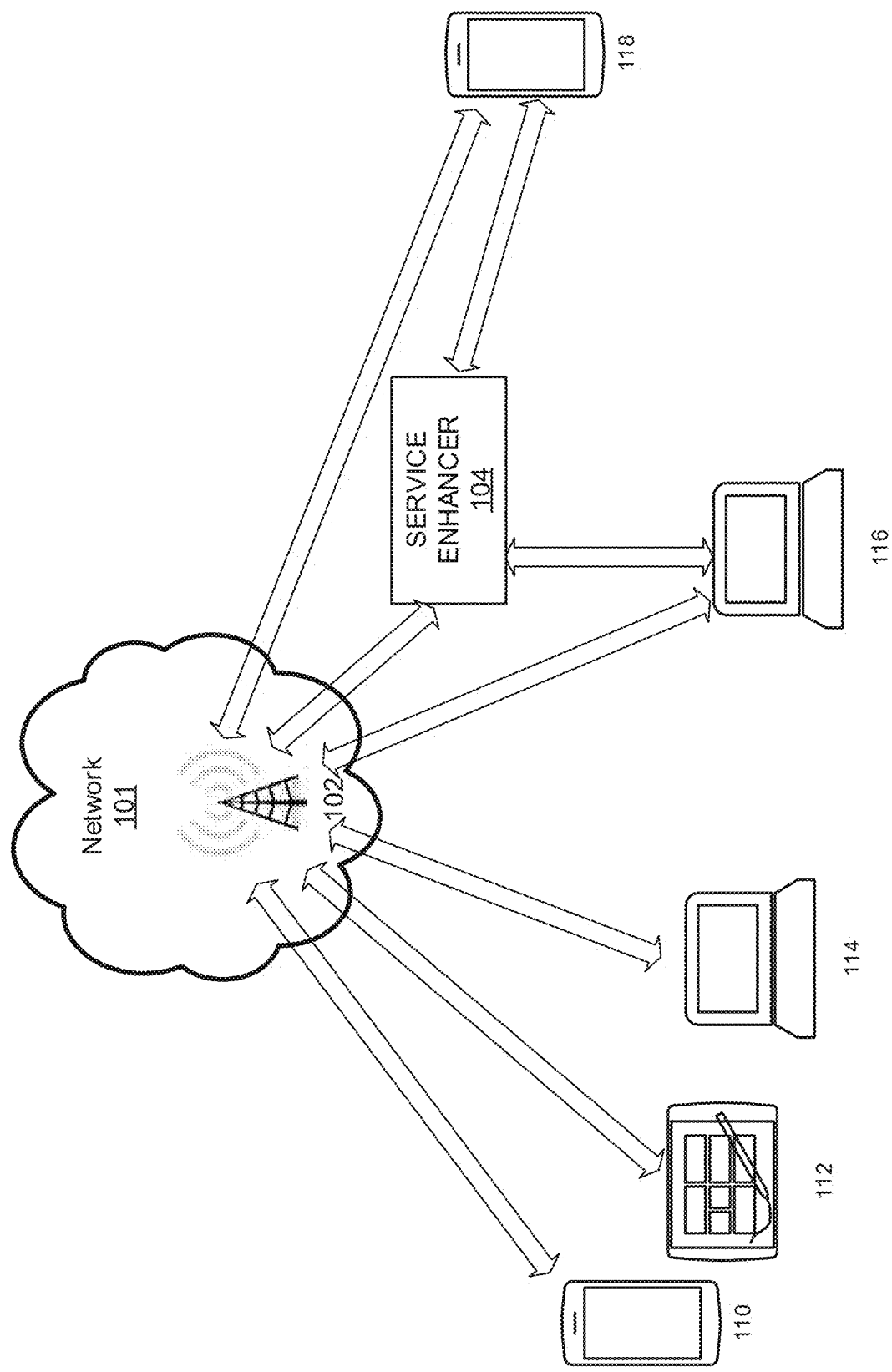
FIG. 1 shows an exemplary operating environment, in accordance with various embodiments.

Reference will now be made in detail to the preferred embodiments of the claimed subject matter, examples of which are illustrated in the accompanying drawings. While the claimed subject matter will be described in conjunction with the preferred embodiments, it will be understood that they are not intended to be limit to these embodiments. On the contrary, the claimed subject matter is intended to cover alternatives, modifications and equivalents, which is included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter is practiced without these specific details. In other instances, well known methods, procedures, components, and circuits have not been described in detail as not to unnecessarily obscure aspects of the claimed subject matter.

Some portions of the detailed description which follows are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "processing," "sending," "determining," "communicating," "identifying," "forming," "establishing," "assigning," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

As described herein, embodiments of the present invention include network-aware nodes that are deployed by an end-user or operator which are configured by a communication network to achieve the following benefits: enhanced coverage; enhanced throughput; enhanced battery life; and the mitigation of cell boundary experiences. The cell boundary experiences may include deadzones or "near deadzones" in network coverage. Embodiments aim to ameliorate at least one of these problems. In accordance with one implementation, the terminal or device is an available user equipment that is idle and that has been volunteered, assigned, or it may be a dedicated node with limited user interface. Embodiments may therefore provide low-cost, flexible deployment, and mobility thereby enabling boundaryless service (e.g., 5G networks).

Embodiments described herein address need-based deployment issues thereby providing a cost efficient alternative to other performance enhancement approaches. The deployment is flexible in that embodiments may be fixed, temporary, nomadic, or mobile. For example, embodiments can be deployed based on the needs of other devices thereby facilitating substantial performance gains in terms of 1) throughput and 2) coverage in blind spots (e.g., a coverage hole) and hot spots (e.g., area with many devices). Some embodiments provide a low cost device that is deployed by a user and may be a cost efficient alternative to operator-based solutions. For example, smart phones, tablets, laptops, or other mobile computing devices can be used. In contrast, operator based solutions, such as centralized radio access network (C-RAN), heterogeneous networks, and relays all require permanent installation of costly equipment (by an operator or service provider), substantial backhaul investment, and costly continuous monitoring and service.

The term "user equipment" (UE) is used herein to refer to terminals, e.g., wireless connected handsets, cell phones, smart phones, tablets, and other mobile computing devices. User equipment in need of network service or enhanced service, due to limited or weak access to a wireless network in a particular area is referred to as "target user equipment" (TUE). The target user equipment provides enhanced connectivity and performance from a service enhancer device, as described herein.

Figure 16:
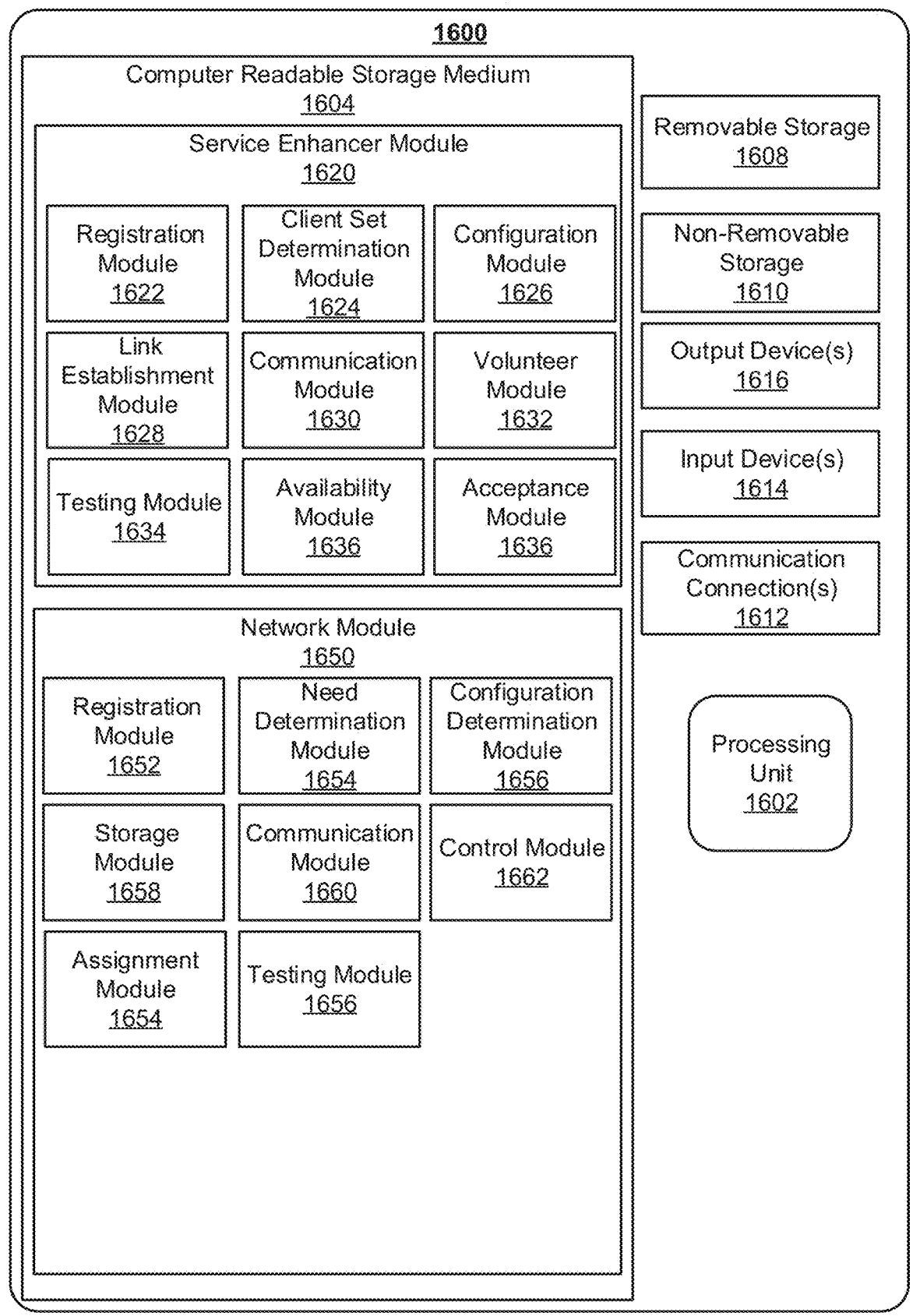
FIG. 16 shows a block diagram of an exemplary computer system platform in accordance with embodiments of the present invention.
Figure 17:
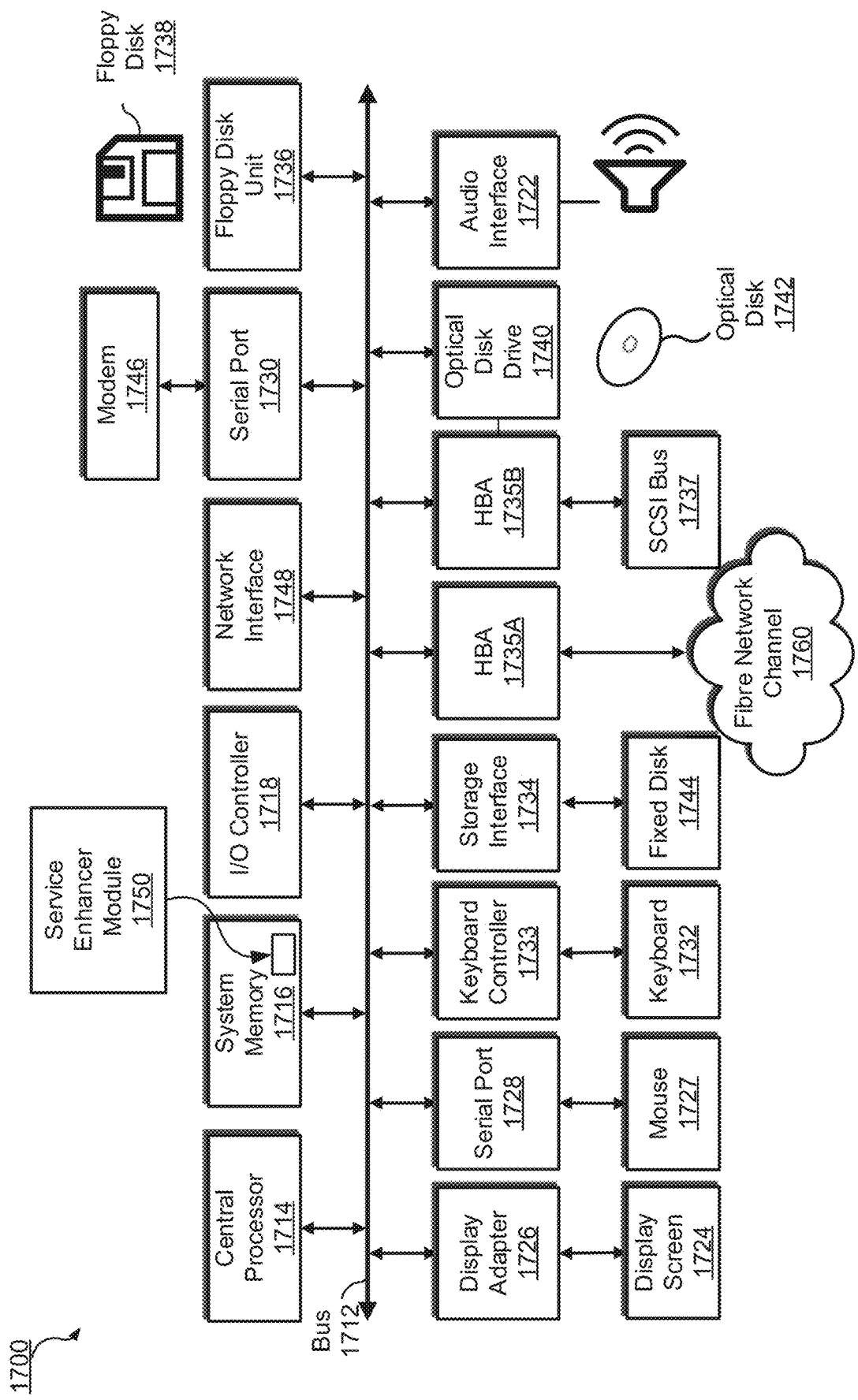
FIG. 17 shows a block diagram of another computer system platform in accordance with embodiments of the present invention.

FIG. 1 and FIGS. 16-17 illustrate example components used by various embodiments of the present invention. Although specific components are disclosed in FIGS. 1 and 16-17, it should be appreciated that such components are exemplary. That is, embodiments of the present invention are well suited to having various other components or variations of the components recited in FIGS. 1 and 16-17. It is appreciated that the components in FIGS. 1 and 16-17 may operate with other components than those presented, and that not all of the components of FIGS. 1 and 16-17 are required to achieve the goals of embodiments of the present invention.

FIG. 1 depicts an exemplary operating environment 100 that includes a base station 102, a service enhancer 104, and computing devices 110-118. The computing devices 110 and 118 may be: smart phones; tablets; or of any other mobile computing device type. The computing devices 114 and 116 may be: laptops; notebooks; desktops; or of any other computing device type. In some embodiments, computing devices 110-118 are user equipment. Base station 102 is a wireless network base station configured to transmit and receive data (e.g., control plane and user plane data) to and from computing devices 110-118. The base station 102 is communicatively coupled to a backbone and other portions of a wireless network 101 including other base stations which, in combination with other components (e.g., servers, backhaul, etc.), forms a wireless network covering a large geographic area. The wireless network 101 includes base station 102 and is configured to provide wireless connectivity to computing devices 110-118 and to provide connectivity to other networks (e.g., other wireless networks, the Internet, etc.).

It is appreciated that the service enhancer device 104 ("service enhancer") is a node that may be specialized, dedicated, custom, or user equipment. For example, in one implementation, the service enhancer 104 is a user's smartphone with capabilities for enhancing wireless service to the computing devices 116-118. The service enhancer 104 may be volunteered by a user and used to enhance network functions after the network has acknowledged the introduction of user's smartphone as the service enhancer 104.

The service enhancer 104 is configured for communicating with the computing devices 116-118 in order to improve quality of service (QoS) over the network. The service enhancer 104 and computing devices 116-118 may form a collaborative group to enhance service. For example, joint processing is performed by the service enhancer 104 and the computing devices 116-118 whereby each device processes a respective signal, and through cooperative communication, the devices improve the quality of the received data that is targeted for an individual device in that group. The service enhancer 104 can also delegate work to the computing devices 116-118, thereby coordinating cooperative processing of data between them. It is noted that the network can send data to the service enhancer 104 organized in a manner allowing optimized processing under the direction of the service enhancer 104.

The service enhancer 104 can be user deployed or operator (e.g., employee of wireless service provider) deployed. The service enhancer 104 can also be configured to operate with existing backhaul equipment of a wireless network (e.g., without any changes to the backhaul equipment). The operator can deploy the service enhancer 104 to a location based on other devices in (or expected to be in) that area for a period of time. The service enhancer 104 can be used to enhance network performance in areas with coverage holes or where the wireless network is overloaded. For example, the service enhancer 104 can be deployed to a location that allows it to support UEs at the boundary of a wireless network or to a location that will be densely packed with mobile devices for an event (e.g., a mall, a concert venue, an airport terminal, a train station, etc.). As another example, the service enhancer 104 can be strategically placed in a neighborhood to help improve network quality of service (QoS). A user may purchase the service enhancer 104 from an electronics store and install the service enhancer 104 in his or her home, office, car, desk, etc. The service enhancer 104 may further be actively used in a user's brief case or other portable carrying apparatus.

When the service enhancer 104 is added to a network, initial handshaking or initial setup communications are performed in order for the service enhancer 104 to be used in the network and acknowledged by the network. For example, the service enhancer 104 sends information about itself including, but not limited to, its processing power and capabilities to the base station 102. In some embodiments, whereby the service enhancer 104 is setup by an operator, the service enhancer 104 is configured (e.g., by the operator) in advance of being added to the network. The acknowledgement by the network includes communication with the wireless network 101 (e.g., backbone of the wireless network) associated with base station 102.

In one implementation, the service enhancer 104 acts as a hub, transfer point, middle point, etc., to extend the network. In certain circumstances, one or more users can volunteer his or her device to be the service enhancer device, provided that the device has sufficient capabilities (e.g., processing capabilities and battery power) and is available (e.g., the device is idle and/or has extra processing power). In some embodiments, whereby a user's device (e.g., cell phone, laptop, tablet, etc.) functions as the service enhancer 104, the user may be provided a financial incentive in the form of cash, credits, or discounted service.

The service enhancer 104 can also mitigate boundary service problems for wireless devices that are located at or near the edge of the network or for devices that encounter interference from neighboring networks. The boundary service problem may also occur due to coverage holes or other areas due to physical structures (e.g., in buildings). The service enhancer 104 can mitigate the boundary service problem by enhancing coverage, enhancing throughput, and increasing battery life for devices. It should also be understood that in networks that rely upon a cellular structure, boundary service problems can arise as a result of intercell interference (e.g., interference caused by overlapping cell coverage within a single operator's network) and may be mitigated through the use of the service enhancer 104.

A device may be designated as a service enhancer 104 by the network 101. The determination of which device is selected as the service enhancer 104 may be done in accordance with a determination that the data destined to the selected device is of a lower priority than the data destined to the devices that can connected through the selected device, along with a determination that the connection of the selected device to the network is of a sufficiently high quality. Using such a determination, a device can be designated as a service enhancer 104 and will then act as a hub providing enhanced service to other devices.

In one implementation, the service enhancer 104 controls which devices are clients. When the service enhancer's client set is closed, only specific devices can benefit from the service enhancer 104. The service enhancer 104 can also determine a subset of client devices (in close proximity to it) that are to receive enhanced service. For example, the service enhancer 104 may be configured to provide improved network performance for point of sale devices at a sporting event venue and not provide improved network performance for a customer device, for instance.

In one embodiment, the base station 102 sends respective control plane signals (e.g., control signaling) for the computing devices 116-118 to both the service enhancer 104 and the respective computing devices 116-118, whereas the service enhancer 104 sends only data (e.g., user plane data) to the computing devices 116-118. The computing devices 116-118 may thus communicate with the service enhancer 104 in conjunction with the base station 102. This is in contrast to a conventional relay, whereby the computing devices perceive the relay as a base station. Furthermore, the service enhancer 104 may typically communicate with the computing devices 116-118 using a device-to-device (D2D) link. The D2D links between the service enhancer 104 and the computing devices 116-118 may be in band or out of band (OOB) (e.g., outside the regular frequency band of a mobile communications network). In contrast, a conventional relay communicates with the computing devices using a standard access link (e.g., cellular phone transmission scheme or a standard wireless device to base station link).

The computing devices 116-118 are "subscribed" to base station 102. The term subscribed means that access to the network by computing devices 116-118 is controlled by base station 102. The service enhancer 104 acts as a transmit point for a small and/or specified number of devices (e.g., the computing devices 116-118). Furthermore, the service enhancer 104 may often be transparent to the computing device 116-118. In contrast with a connection through a conventional relay, a device would be subscribed to a relay and the relay would typically act as a base station for a large number or group of devices. A conventional relay is usually non-transparent to the devices that obtain network access therefrom. Also, the client set for the service enhancer 104 may be either open or closed (e.g., restricted to certain devices). In contrast, the client set for a conventional relay is always open. The service enhancer 104 typically is not managed by the network. In contrast, a conventional relay is usually managed by a network.

The service enhancer 104 and a conventional relay handle control plane signaling differently. The service enhancer 104 will not necessarily initiate a control plane connection and typically a device will get the control plane information directly from a base station (e.g., base station 102). In contrast, a conventional relay usually initiates the control plane connection and the relay usually manages control, data, and scheduling.

The service enhancer 104 is configured to communicate with the network 101 which is associated with the base station 102 and the computing devices 116-118. The communications between the service enhancer 104 and the network 101 may be based on the same transmission mode and the same frequency that are used to communicate between the base station 102 and the computing devices 116-118. In some embodiments, special or specific transmission modes (e.g., Wi-Fi, cable, etc.) may be used for communication between the network 101 and the service enhancer 104.

The communication between the service enhancer 104 and the computing devices 116-118 may be a direct mobile transmission mode that can be in-band or out-band. For example, if the network operates at 2.1 Ghz, the service enhancer 104 and the computing devices 116-118 can communicate in the 2.1 Ghz range using the same orthogonal frequency-division multiplexing (OFDM) protocol as the network 101. Other communication bands can be used for communication between the service enhancer 104 and the computing devices 116-118 which may thus be out-of-band or in another band. For example, 800 MHz or 3.4 GHz are used for communication between the service enhancer 104 and the computing devices 116-118 (e.g., independent of network 101). The service enhancer 104 may determine which transmission modes and frequencies are used to communicate with computing devices 116-118. In some embodiments, a network component (e.g., base station 102) of network 101 may send information of the available frequency bands to the service enhancer 104. In some embodiments, a network component (e.g., base station 102) of network 101 may send information of the communication bands of the computing devices to the service enhancer 104. For example, the service enhancer 104 may receive the desired communication bands of one or more computing devices. It is noted that the use of different transmission modes and frequency bands, may provide better quality communication without interfering with network communication. For example, the use of another transmission technology (e.g., code division multiple access (CDMA) instead of OFDM) may result in less interference with other network communications. Communication between the service enhancer 104 and the computing devices 116-118 can further be made through Multi-RAT (Multiple Radio Access Technologies). For example, the communication between the service enhancer 104 and the computing devices 116-118 can be through WiFi, while communication between the service enhancer 104 and the base station 102 can be different, such as via CDMA.

The service enhancer 104 may register with the network in multiple ways based on the configuration of the service enhancer 104. The registration process may be different for the service enhancer 104, depending on whether the service enhancer 104 is a dedicated device, user equipment, or deployed by a user or an operator. The service enhancer 104 can be a dedicated terminal deployed by an end user to enhance service for a target physical area or select target devices and the service enhancer 104 can optionally be registered with the network for a closed client set. In other embodiments, the service enhancer 104 can be a dedicated terminal deployed by an operator that is registered by the network as a low cost alternative for coverage enhancement for hotspot service, e.g., blind spots, etc. Embodiments may operate in tandem with a Wi-Fi hotspot device. The service enhancer 104 may thus be placed at location with a good access link (e.g., having a strong signal, throughput, etc.) and in the vicinity of computing devices 116-118.

In one embodiment, the service enhancer 104 can be a dedicated terminal with limited or no user interface functionalities. For example, the service enhancer 104 might not have a touch screen. The service enhancer 104 typically has physical (PHY)/media address control (MAC) layer processing to facilitate operating multiple devices at higher access spectral efficiencies. The service enhancer 104 may have access to the power grid, multiple antennas, a better power amplifier (PA), a higher maximum Quadrature Amplitude Modulation (QAM), and multiple layer Spectrum Management (SM). For example, the service enhancer 104 may have higher processing power to be able to process data for multiple devices that is received from the network and distributed to nearby devices (e.g., the computing devices 116-118).

In one embodiment, the service enhancer 104 is an idle user device. In this case, the idle user device, or equipment, has a good access link, and is temporarily volunteered (e.g., by its user) or assigned by the network to function as the service enhancer 104. The user device or user equipment that functions as the service enhancer 104 communicates with the base station 102 (e.g., via a standard air interface such as Long-Term Evolution (LTE)). An idle user device can be volunteered as a service enhancer 104 by a user or assigned to act as a service enhancer 104 by a network. The volunteering or assignment of a user device as a service enhancer is typically a temporary assignment that is maintained until the requirement or availability of the device expires. For example, when an idle user equipment is acting as the service enhancer 104, the idle user equipment receives an assignment to temporarily function as the service enhancer 104 until the need for enhanced service expires. Upon expiration, the formerly idle user equipment can be switched back to communicate directly with the base station 102.

In some embodiments, during communication with the service enhancer 104, the computing devices 116-118 stay subscribed to base station 102. The computing devices 116-118 receive control signaling from base station 102 or from the service enhancer 104, thereby enabling decoding of the received data. Sending the control signaling is initiated by base station 102. The control signaling includes information related to how data will be sent including, but not limited to, the coding, the time, the frequency band, and associated resources.

The service enhancer 104 acts as a temporary transmit point (TP) that is transparent to the computing devices 116-118. For example, the service enhancer 104 obtains data from the network and sends the data to the computing devices 116-118 without the computing devices 116-118 being aware that the data is being routed through the service enhancer 104 due to the computing devices 116-118 receiving control signals from the base station 102 and the communications between the service enhancer 104 and the computing devices 116-118 being in-band. Alternatively, the link between the service enhancer 104 and the computing devices 116-118 can be implemented as a device-to-device (D2D) link. The D2D link can optionally utilize a transmission scheme different than the transmission scheme of the network 101 associated with base station 102. For example, D2D link may be in-band, out-band, or multi-RAT, as described herein.

In other embodiments, the service enhancer 104 acts as a cooperative delegate to the network and thereby enables collaborative processing and communication. The service enhancer 104 signals the network via the base station 102 to inform the network that one or more computing devices (e.g., the computing devices 116-118) are going to cooperate and the service enhancer 104 will coordinate delegation. The network then optimizes the data for sending to the service enhancer 104 for delegation. The service enhancer 104 can then coordinate cooperation between the computing devices 116-118. The control signaling for how, when, and where the data will be sent to the computing devices is sent from the base station 102 directly to the computing devices 116-118 or to the computing devices 116-118 via the service enhancer 104.

The data transmission can be network dependent. For example, the user equipment or computing device control signaling is initiated by the base station 102 and sent directly from the base station 102 to the computing devices 116-118. The base station may thus control where, when, and how the data is sent to the computing device, while the service enhancer 104 can act as a reflector or rerouter of data from the base station 102.

In other embodiments, data transmission is network assisted, whereby the control signaling is initiated by the base station 102 but may be overridden by the service enhancer 104. For example, the base station 102 indicates that some particular data should be sent at a particular time and the service enhancer 104 responds by indicating that there is too much traffic or that the coding is insufficient, so the rate of transmission should be reduced to allow proper decoding. As another example, the service enhancer 104 overrides a control signal from the base station 102 to send data and responds with a message that data should not be sent at this time or should be sent through another coding scheme.

In other embodiments, the control signaling of the computing device is initiated by the service enhancer 104 while the base station 102 assists or supervises the connection setup and user-plane offload between service enhancer 104 and the computing device. For example, the base station 102 may send an indication to the service enhancer 104 to send data to a particular computing device at a particular time with a particular resource coding. The service enhancer 104 acknowledges and performs accordingly. Supervision by the base station 102 is performed based on an overview of the network and each of the service enhancers in the network.

In another embodiment, the data transmission can also be network independent. In this case, the control signaling of the computing devices are initiated by the service enhancer 104. The service enhancer 104 may thus determine how, where, which transmission scheme, and which frequency band, should be used to communicate between itself and a computing device without any interference or intervention by the network. Once the connection between the computing device and the service enhancer 104 is setup, the computing device and the service enhancer 104 inform the base station 102 of the frequency band and communication scheme that will be used for communication.

In one embodiment, the service enhancer 104 may cease to provide data communication to the computing devices 116-118 and can provide an associated notification to the computing devices 116-118. The service enhancer 104 sends a notification indicating that the service enhancer is no longer going to provide data communications to the computing devices 116-118. Upon receiving the notification, the computing devices 116-118 can switch back to communicating directly with base station 102, e.g. unassisted by the service enhancer 104, (or alternatively can connect to a different service enhancer). The computing devices 116-118 may set a timer, and if no communications are received from the service enhancer 104, upon expiration of the timer, the computing devices continue communicating directly with the base station 102. The computing devices 116-118 can adjust their feedback to take into consideration assistance from the service enhancer 104. For example, a channel quality indicator (CQI) report could be a combined effective CQI report so that the base station 102 can continue its operation in a transparent mode.

With reference to FIGS. 2-11, flowcharts 200-1100 illustrate example functions used by various embodiments of the present invention for identifying electronic documents. Although specific function blocks ("blocks") are disclosed in flowcharts 200-1100, such steps are exemplary. That is, embodiments are well suited to performing various other blocks or variations of the blocks recited in flowcharts 200-1100. It is appreciated that the blocks in flowcharts 200-1100 can be performed in an order different than presented, and that not all of the blocks in flowcharts 200-1100 need be performed.

Figure 2:
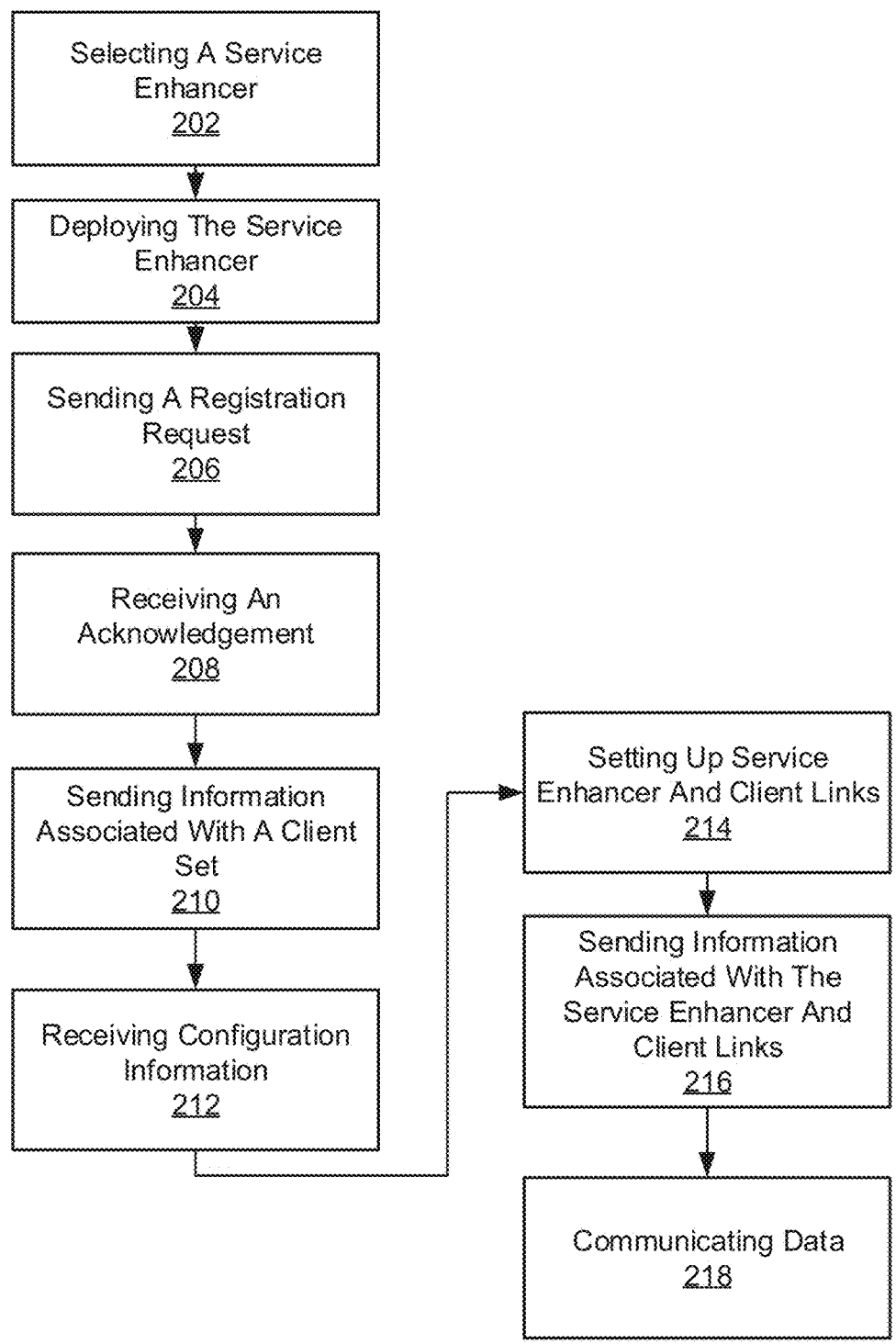
FIG. 2 shows an exemplary network assisted setup process of a service enhancer deployed by an end-user, in accordance with embodiments of the present invention.

FIG. 2 shows an exemplary network assisted setup process of a service enhancer deployed by an end-user, in accordance with an embodiment of the present invention. FIG. 2 depicts a process 200 that is performed by a service enhancer in joining a network and thereby enhancing service for one or more pieces of user equipment or devices. Process 200 can be performed by a service enhancer that is a dedicated terminal or device that is deployed by an end user, and where the setup is network assisted. For example, the end user may have acquired the service enhancer for coverage assistance.

At block 202, the service enhancer is selected. At block 204, the service enhancer is deployed. The service enhancer is deployed or physically placed at a location determined by the end user. The deployment further includes connecting the service enhancer to a power source and/or turning on or otherwise activating the service enhancer. For example, the service enhancer can be deployed at a location within a building where there is not good coverage. As another example, the service enhancer can be installed in a location where there are many devices in contention for limited network resources. Further, the service enhancer may be deployed in mobile locations (e.g., a car, a train, a portable container, etc.).

The service enhancer is installed at a location based on one or more other devices having weak or no signal coverage. For example, the service enhancer can be located at a location having a reasonably strong connection to a wireless network while being near a deadzone and thereby able to enhance service there. A deadzone is a coverage hole, where service is very weak or nonexistent.

At block 206, a registration request is sent. The registration request is part of a handshaking process that is performed before the service enhancer is able to communicate with particular devices on the network. The service enhancer sends a registration request to the network including, but not limited to, its capabilities. In one embodiment, the service enhancer announces its own presence. For example, the registration request may include the communication bands, communication schemes, modulation, and transmission technologies that can be used by the service enhancer and the network. The service enhancer can report capabilities including: frequency band; processing power (e.g., CPU model and CPU speed); power source and level (e.g., percent of battery remaining or whether the service enhancer is coupled to an electrical socket); and transmission coding schemes.

At block 208, an acknowledgment is received. The network (e.g., the base station 102) sends the acknowledgment to the service enhancer acknowledging that the service enhancer will be functioning in the network. For example, the network may acknowledge the service enhancer as not being a cellular telephone but rather as a device that will provide service to one or more cell phones.

At block 210, information associated with a client set is optionally sent. The service enhancer may send a closed client set or a discovered set of neighboring devices to the network. For example, the service enhancer may report that there are five cell phones or laptops proximately located relative to the service enhancer, and unique identifiers (e.g., mobile equipment identifier (MEID)) associated with each device are reported. The service enhancer further can report that the five cell phones or laptops currently have weak or no network signal and that the service enhancer will be able to provide improved service access to each of the devices. The service enhancer is able to determine, independent of the network, that the service enhancer has a strong signal channel to the five cell phones or laptops, whereas five cell phones or laptops have a weak signal channel to the network.

At block 212, configuration information is received. The configuration information is received by a service enhancer from a base station or other part of the network which includes, but is not limited to, the frequency band and coding scheme that will be used to send data from the base station to the service enhancer. The base station, network, etc., may send the service enhancer a unique ID to be used so that the service enhancer can be recognized in the future.

At block 214, service enhancer and client links are setup. The service enhancer sends frequency band and coding scheme architecture to client devices (e.g., TUEs, the computing devices 116-118, etc.) that will be used to communicate with one or more clients. The clients receive the frequency band and coding scheme information and acknowledge the information, thereby allowing the service enhancer and client links to be established.

At block 216, information associated with the service enhancer and the client links is sent. The information associated with the service enhancer and the client links includes one or more indicators of the links established between the service enhancer and the clients. The information associated with the service enhancer and the client links is sent to the network.

At block 218, data is communicated. Downlink data is communicated from the base station through the service enhancer to a client. Uplink data from a client is communicated from a client to the base station through the service enhancer. The data is processed by the service enhancer prior to sending to a client and eventually to the network.

Figure 3:
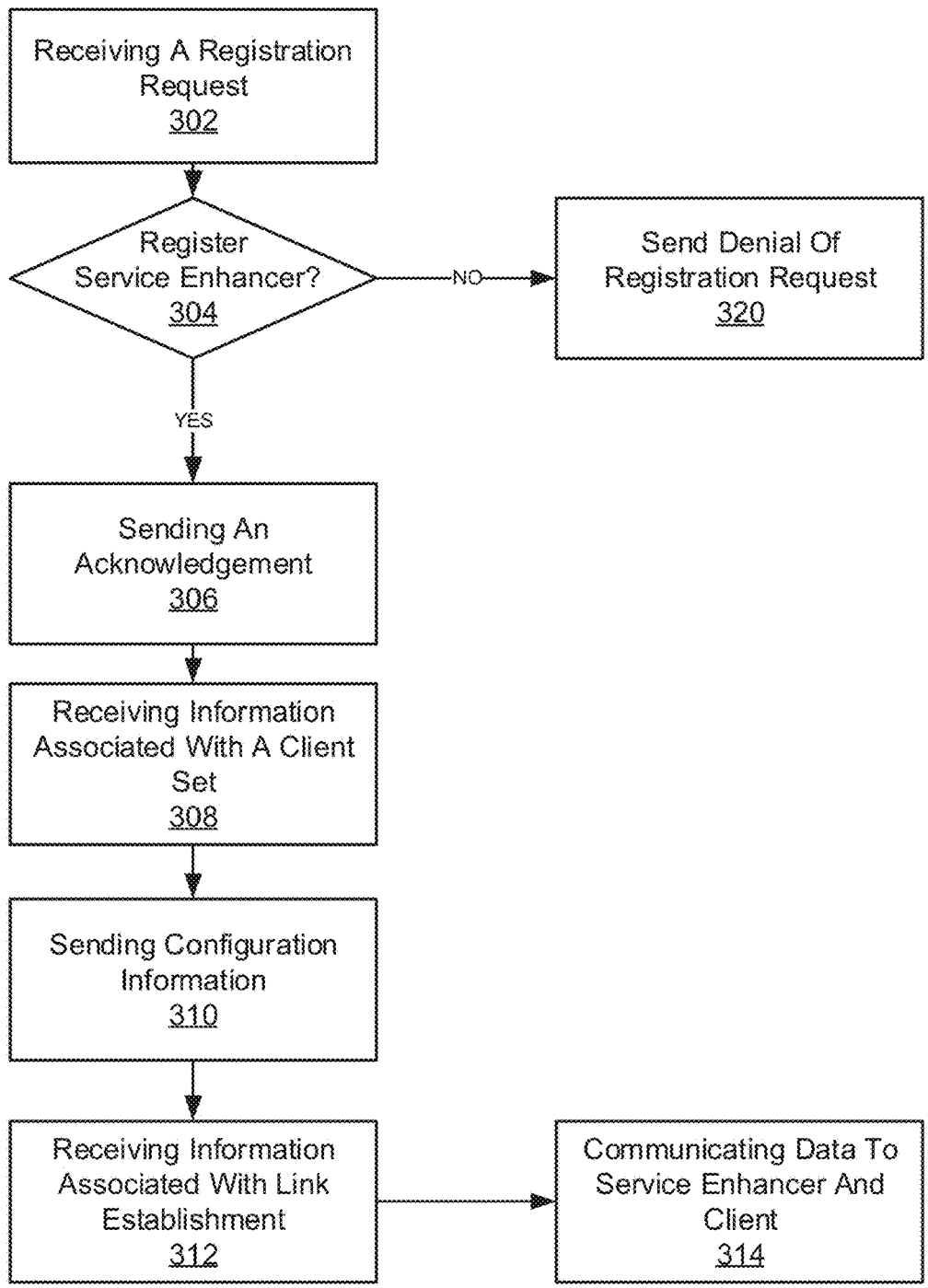
FIG. 3 shows an exemplary process performed by a network component during network-assisted setup of a service enhancer device deployed by an end-user, in accordance with embodiments of the present invention.

FIG. 3 shows an exemplary process 300 performed by a network component during network assisted setup of a service enhancer deployed by an end-user, in accordance with an embodiment of the present invention. FIG. 3 depicts a process 300 that is performed by a base station or other network component during the setup of a service enhancer. The process 300 is generally performed by one or more network components in conjunction with a service enhancer performing process 200.

At block 302, a registration request is received at a base station or other network component from a service enhancer. The registration request includes the capabilities of the service enhancer, such as supported communication schemes.

At block 304, a determination as to whether to register the service enhancer with the network is made. A network component (e.g., base station) determines whether the service enhancer will be registered and used to improve service to one or more devices. The registration is based on the need for, and capabilities of, the service enhancer. If the service enhancer is to be registered, block 306 is performed. If the service enhancer is not registered, block 320 is performed.

At block 320, a denial of the registration request is sent. The service enhancer is not permitted to register and communicate with the network as a service enhancer. For example, if the service enhancer does not have sufficient capabilities (e.g., processing power, battery life, communications signal strength, and/or security), a network component can send a denial of the registration request.

At block 306, an acknowledgement is sent which approves the registration request that was sent by the service enhancer and approves the service enhancer to function as a service enhancer with the network.

At block 308, information associated with a client set is received. The information includes identifiers of the client devices in the client set of the service enhancer.

At block 310, configuration information is sent. The configuration information is determined by one or more network components and includes configuration information for the service enhancer to use in communicating with a base station or other network components.

At block 312, information associated with link establishment is received. The information associated with the link establishment includes information associated with links between a service enhancer and one or more clients.

At block 314, data is communicated to the service enhancer and the client. Control plane information can be communicated directly to the client while other data communications are communicated to the client through the service enhancer.

Figure 4:
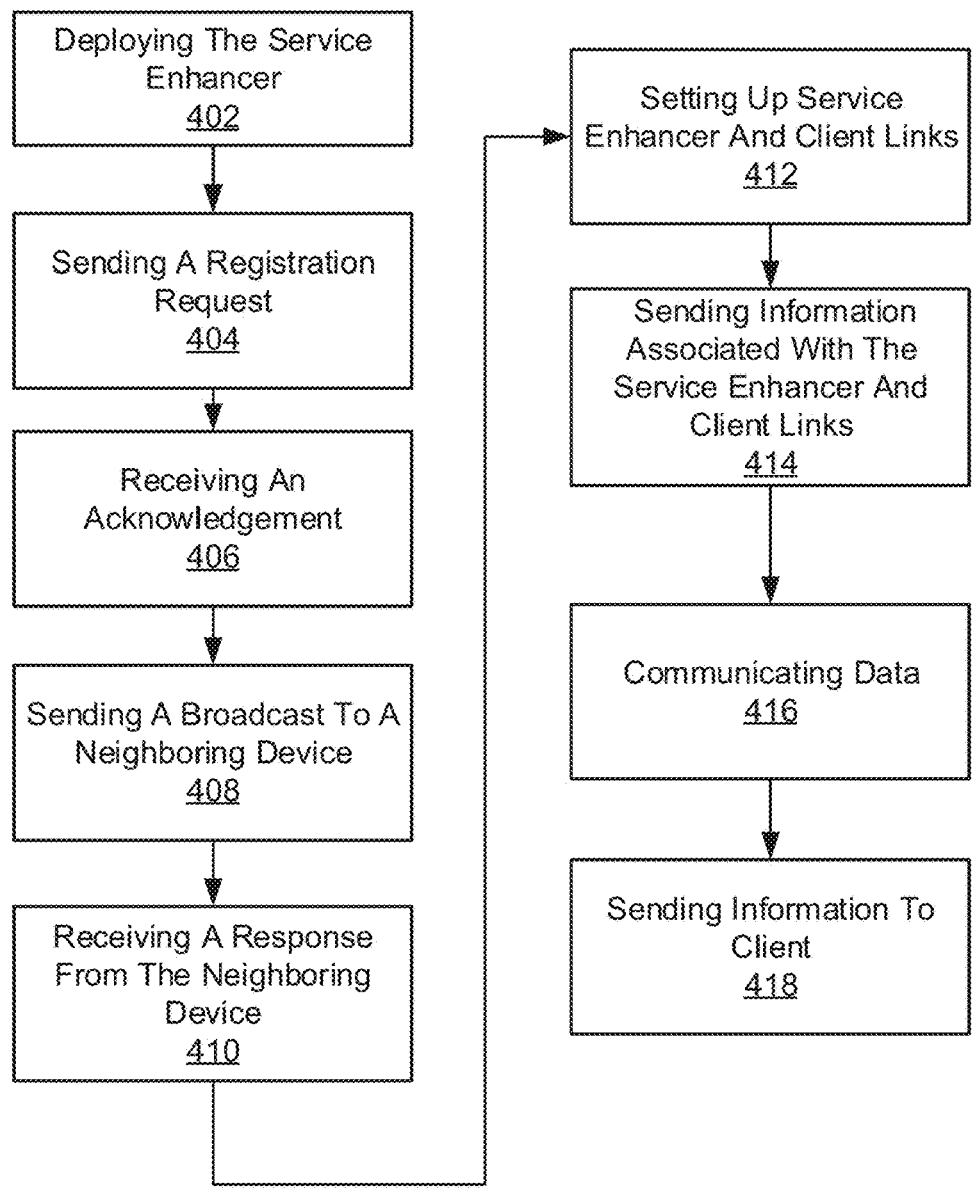
FIG. 4 shows an exemplary network independent setup process of a service enhancer device deployed by an end-user, in accordance with embodiments of the present invention.

FIG. 4 shows an exemplary network independent setup process 400 of a service enhancer deployed by an end-user, in accordance with an embodiment of the present invention. FIG. 4 depicts a process 400 that is performed by a service enhancer in joining a network and enhancing service for one or more pieces of user equipment or devices. The process 400 is performed by a service enhancer that can be a dedicated terminal or device that is deployed by an end user and the setup is network independent. For example, the end user may have acquired the service enhancer.

At block 402, the service enhancer is deployed or physically placed at a location determined by the end user. The service enhancer may have been purchased by the end user, for instance, off the shelf, and then deployed at a proper location. The deployment further includes coupling the service enhancer to a power source and/or turning on or activating the service enhancer. For example, the service enhancer is deployed at a location within a building where there is poor coverage. As another example, the service enhancer is installed in a location where there are many devices such that the devices are in contention for limited network resources. The service enhancer may further be deployed in a mobile location (e.g., a car, a train, a portable container, etc.). The service enhancer is installed at a location based on one or more other devices having a weak or no signal coverage.

At block 404, a registration request is sent and is part of a handshaking process that is performed before the service enhancer is able to communicate with particular devices on the network. The service enhancer announces its presence and sends a registration request to the network where the registration includes, but is not limited to, its capabilities. For example, the registration request may include the communication bands, communication schemes, modulation, and transmission technologies that can be used for communication with the service enhancer and the network. The service enhancer may report capabilities including frequency band, processing power, power source and level, and transmission coding schemes.

At block 406, an acknowledgement is received. The network sends an acknowledgment to the service enhancer acknowledging that the service enhancer will be functioning in the network. In some embodiments, configuration information for the service enhancer is received in addition to the acknowledgment. The configuration may include the transmission scheme (e.g., frequency band) and coding scheme that a network component (e.g., base station) will use to communicate with the service enhancer.

At block 408, the service enhancer sends a broadcast message to one or more neighboring devices with an indicator that the service enhancer is available to provide service enhancement.

At block 410, the service enhancer receives one or more responses from one or more neighboring devices that indicate that one or more neighboring devices would like to communicate with the network through the service enhancer. The response thereby allows the neighboring device to be discovered by the service enhancer.

At block 412, service enhancer and client links are setup. The client responds that it can use the services of the service enhancer and shares information enabling the set up of the service enhancer and client links. The information may include a unique identifier of the client which enables the service enhancer to access communications for the client and communication scheme information.

At block 414, information associated with the service enhancer and client links is sent. The information associated with the service enhancer and the client links includes one or more indicators of the links established between the service enhancer and the clients. The information associated with the service enhancer and the client links is sent to the network.

At block 416, data is communicated between the service enhancer, the client, and the network. Downlink data is communicated from the base station through the service enhancer to a client. Uplink data from a client is communicated from a client to the base station through the service enhancer.

At block 418, information is sent to the client. In some embodiments, the service enhancer sends information to the client. The information may include a soft bit, raw in-phase (I) data, quadrature (Q) data, and decoded data. In some embodiments, the client may receive data only from the service enhancer. In some embodiments, data from the base station may be received at the client from the base station and from the service enhancer. The service enhancer may process data from the base station (e.g., decode the data) and send the processed data to the client. The client combines downlink or downstream information from the service enhancer and the base station. The client may thus have a copy of the data from the service enhancer and the base station. The copies may not be perfect (e.g., include one or more errors) and the client may thus compare and merge the data to obtain the correct data.

Figure 5:
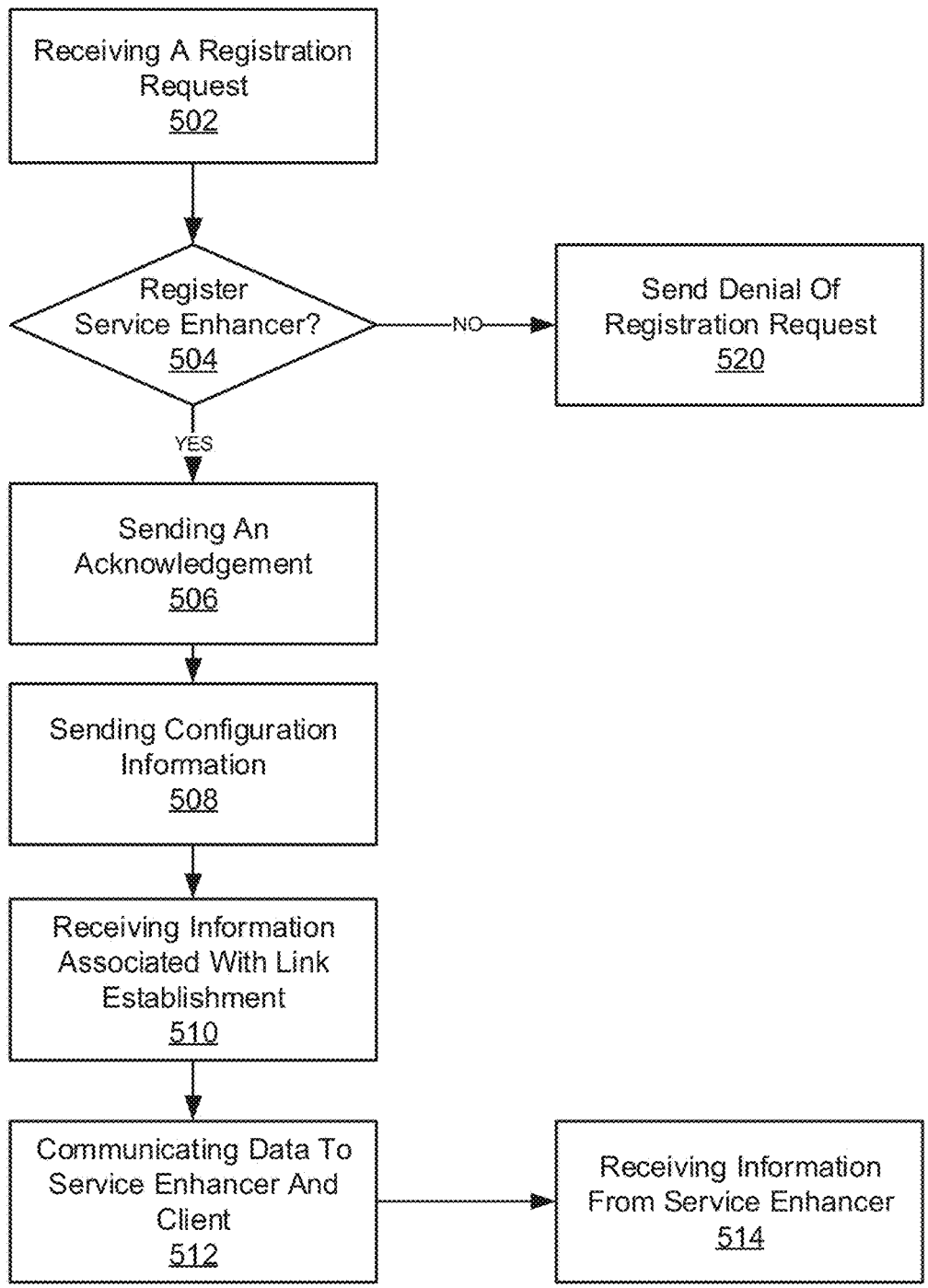
FIG. 5 shows an exemplary process performed by a network component during network independent setup of a service enhancer device deployed by an end-user, in accordance with embodiments of the present invention.

FIG. 5 shows an exemplary process 500 performed by a network component during network independent setup of a service enhancer deployed by an end-user, in accordance with an embodiment of the present invention. FIG. 5 depicts a process 500 that is performed by a base station or other network component (e.g., backbone server, wireless device, etc.) during the setup of a service enhancer. The process 500 is generally performed by one or more network components in conjunction with a service enhancer performing process 400.

At block 502, a registration request is received at a base station or other network component from a service enhancer. The registration request includes the capabilities of the service enhancer, as described herein.

At block 504, a determination as to whether to register the service enhancer with the network is made. In some embodiments, a network component (e.g., base station) may determine whether the service enhancer will be registered and used to improve service to one or more devices. If the service enhancer is to be registered, block 506 is performed. If the service enhancer is not to be registered, block 520 is performed.

At block 520, a denial of the registration request is sent and the service enhancer is not permitted to register and communicate with the network as a service enhancer. For example, if the service enhancer does not have sufficient capabilities (e.g., processing power, battery life, communication signal strength, and/or security), a network component sends a denial of the registration request.

At block 506, an acknowledgement is sent. The acknowledgement approves the registration request that was sent by the service enhancer.

At block 508, configuration information is sent. The configuration information is determined by one or more network components and includes configuration information for the service enhancer to use in communicating with a base station or other network components.

At block 510, information associated with link establishment is received. The information associated with link establishment includes information associated with links between a service enhancer and one or more clients.

At block 512, data is communicated to the service enhancer and the client. Control plane information is communicated directly to the client while data communications are communicated to the client through the service enhancer.

At block 514, information is received from the service enhancer. The information is sent to the base station or other network component and/or client. The service enhancer sends information to the client and the base station. The client may combine downlink or downstream information from the service enhancer and the base station. The information may include a soft bit, raw in-phase (I) data, quadrature (Q) data, and decoded data.

Figure 6:
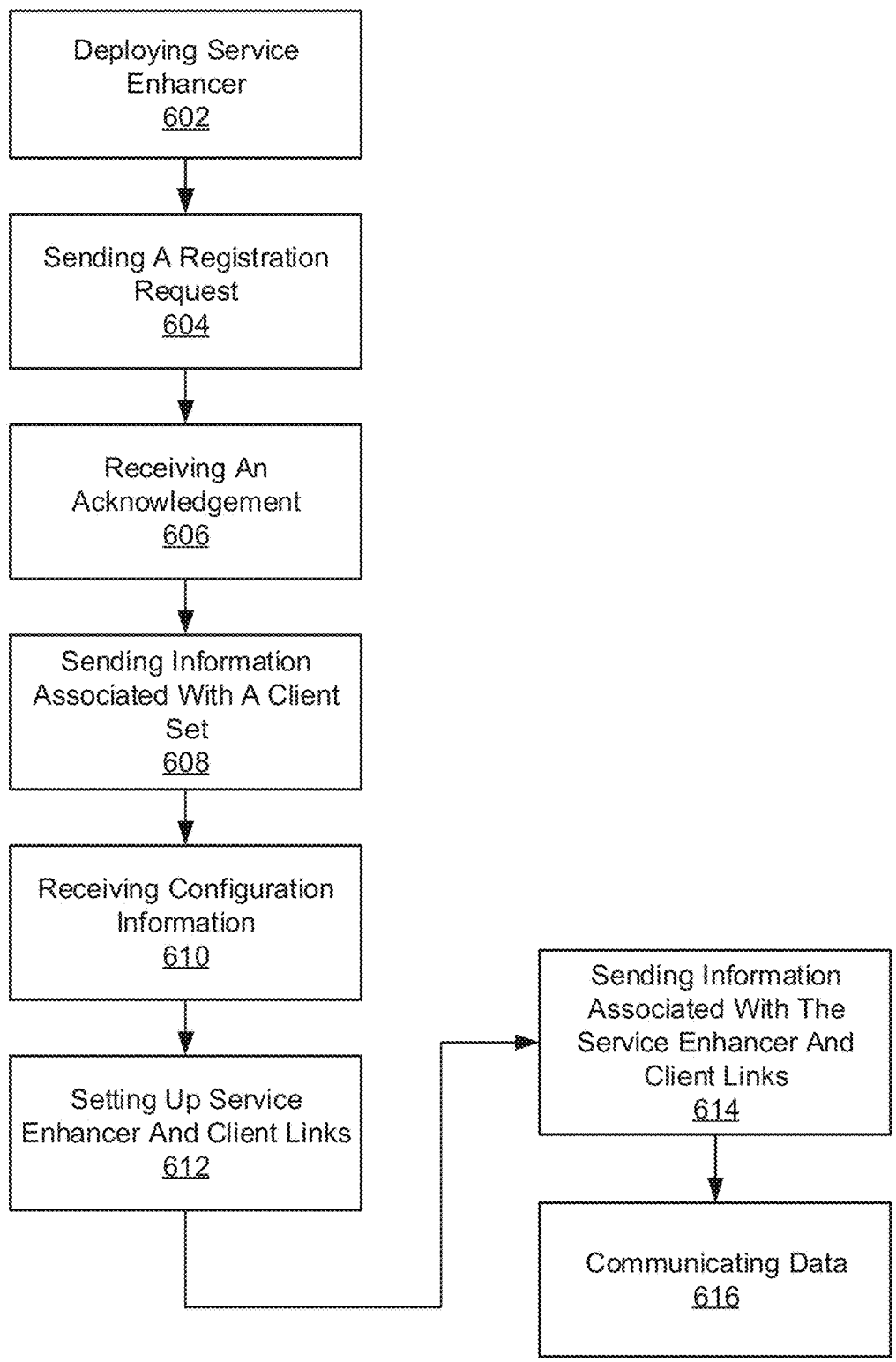
FIG. 6 shows an exemplary setup process of a service enhancer device deployed by an operator, in accordance with embodiments of the present invention.

FIG. 6 shows an exemplary setup process 600 of a service enhancer deployed by an operator, in accordance with an embodiment of the present invention. FIG. 6 depicts a process 600 that is performed by a service enhancer deployed by a network operator (e.g., service provider employee), in joining a network and enhancing service for one or more pieces of user equipment or devices. The process 600 is performed by a service enhancer that is a dedicated terminal or device that is deployed by an operator and the setup can be network assisted or network independent.

At block 602, a service enhancer is deployed or physically situated by a network operator at a location that is determined based on the need for the service enhancer. The deployment further includes coupling the service enhancer to a power source and/or turning on or activating the service enhancer. For example, the service enhancer is deployed at a location within a building where there is weak network coverage. As another example, the service enhancer is installed in a location where there are many devices such that the devices are in contention for limited network resources. The service enhancer may also be deployed in mobile location (e.g., a vehicle at a sporting event, a train, etc.).

At block 604, a registration request is sent. The registration request is part of a handshaking process that is performed before the service enhancer is able to communicate with particular devices on the network. The service enhancer announces its own presence and the service enhancer sends a registration request, including its capabilities, to the network. For example, the registration request may include the communication bands, communication schemes, modulation, transmission technologies, etc., that can be used to communicate with the service enhancer and the network.

At block 606, an acknowledgment is received. The network sends an acknowledgment to the service enhancer acknowledging that the service enhancer will be functioning in the network at a service enhancer. For example, the network may acknowledge the service enhancer as not functioning as a cellular telephone, but rather, as a device that will provide service to one or more cell phones.

At block 608, information associated with a client set is optionally sent. The service enhancer sends a closed client set or a discovered set of neighboring devices to the network. For example, the service enhancer reports that there are five cell phones or laptops proximately located relative to the service enhancer and the service enhancer may report unique identifiers (e.g., mobile equipment identifier (MEID)) associated with each device. The service enhancer may further report that the five cell phones or laptops currently have weak or no network signal and that the service enhancer will be able to provide improved service access to each of the devices. The service enhancer is able to determine, independent of the network, that the service enhancer has a strong signal channel to the five cell phones or laptops, whereas the five cell phones or laptops have a weak signal channel to the network.

At block 610, configuration information is received. The configuration information is received by a service enhancer from a base station or other part of the network which includes the frequency band and coding scheme that will be used to send data from the base station to the service enhancer. The base station sends the service enhancer a unique identifier (ID) to be used so that the service enhancer can be recognized in the future.

At block 612, service enhancer and client links are setup. The service enhancer sends frequency band and coding scheme architecture information to client devices that will be used to communicate with one or more clients. The clients may receive the frequency band and coding scheme information and acknowledge the information thereby allowing the service enhancer and client links to be established.

At block 614, information associated with the service enhancer and the client links is sent. The information associated with the service enhancer and the client links includes one or more indicators of the links established between the service enhancer and the clients. The information associated with the service enhancer and the client links is sent to the network.

At block 616, data is communicated. Downlink data is communicated from the base station through the service enhancer to a client. Uplink data from a client is communicated from a client to the base station through the service enhancer. The data is processed by the service enhancer prior to sending the data to a client and to the network.

Figure 7:
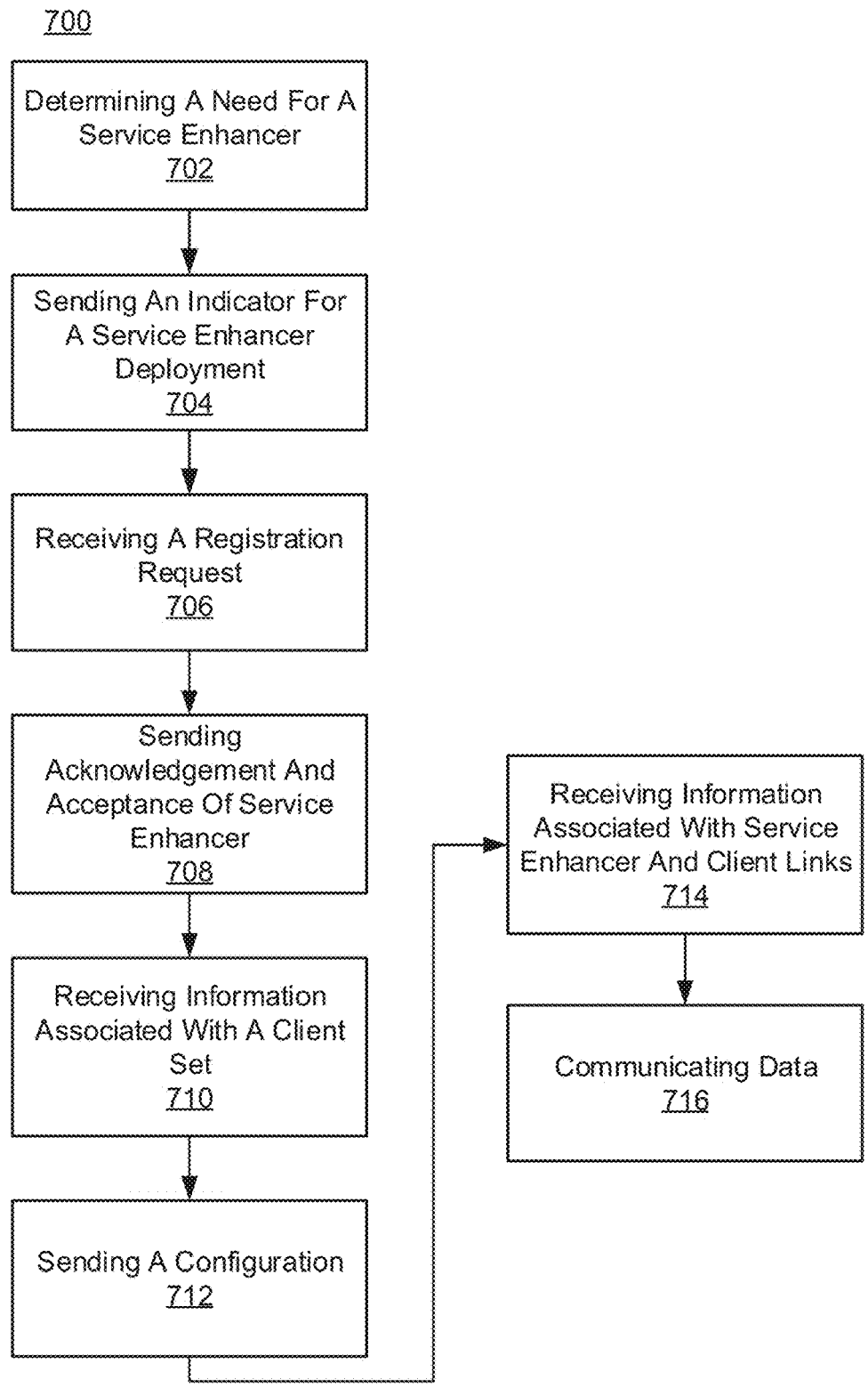
FIG. 7 shows an exemplary process performed by a network component during setup of a service enhancer device deployed by an operator, in accordance with embodiments of the present invention.

FIG. 7 shows an exemplary process 700 performed by a network component during setup of a service enhancer deployed by an operator, in accordance with an embodiment of the present invention. FIG. 7 depicts a process 700 that is performed by a base station or other network component during the setup of a service enhancer. The process 700 is performed generally by one or more network components in conjunction with a service enhancer and the setup can be network assisted or network independent.

At block 702, a need for a service enhancer is determined by a network component, and may be based on reports of service issues, problematic connectivity, etc. The need for a service enhancer may further be determined based on a dead-zone report, a hotspot (e.g., an area where there will be many devices at some point in time), energy savings requirements, coverage extensions, etc. For example, a base station may determine there are one or more devices at the edge of the network based on detected weak signals or connections to the one or more devices. The weak connections to the one or more devices shorten their respective battery life and thus the need for a service enhancer can be based on an interest to preserve battery life instead of spending energy trying to obtain a better signal.

At block 704, an indicator for a service enhancer is sent to a system, e.g., having a graphical user interface, to allow an operator to be informed of the need for a service enhancer as well as the location where the service enhancer is needed.

At block 706, a registration request is received at a base station or other network component from a service enhancer that has been deployed. The registration request may include the capabilities including the communication scheme supported by the service enhancer, as described herein.

At block 708, an acknowledgement is sent. The acknowledgement approves the registration request that was sent by the service enhancer and approves the service enhancer to function as service enhancer with the network.

At block 710, information associated with a client set is received. The information includes identifiers of the clients in the client set of the service enhancer.

At block 712, configuration information is sent. The configuration information is determined by one or more network components and includes configuration information for the service enhancer to use in communicating with a base station or other network components.

At block 714, information associated with link establishment is received. The information associated with link establishment includes information associated with links between a service enhancer and one or more clients.

At block 716, data is communicated to the service enhancer and the client. In some embodiments, control plane information is communicated directly to the client whereas other data communications are communicated to the client through the service enhancer.

FIG. 8 shows an exemplary setup process 800 of a device volunteered to function as a service enhancer, in accordance with an embodiment of the present invention. FIG. 8 depicts a process 800 that is performed by device that has been volunteered to function as a service enhancer and is going to join a network as a service enhancer and enhance service for one or more pieces of user equipment or devices. The process 800 can be performed by a user's smart phone, cell phone, laptop, tablet, etc., and the setup can be network assisted or network independent.

At block 802, a setting is configured for operating as a service enhancer. In some embodiments, a user may configure a setting on his or her device to be used by the network as a service enhancer. For example, the setting may involve using the user equipment as service enhancer when the user equipment is idle. The setting may be available based on a threshold, e.g., the phone having processing power and/or battery life above a threshold.

At block 804, an indication of the device being operable to act as service enhancer is sent. The indication also indicates that the user equipment has been volunteered to act as a service enhancer at a specific time, upon a condition (e.g., being idle), and at a particular location, as determined by the network. The indicator is used to generate a list of devices that may act as service enhancers.

At block 806, a request is received for the device to act as a service enhancer. In some embodiments, a device receives a broadcast request to act as a service enhancer based on the service enhancer being in an identified region (e.g., a deadzone, near a deadzone, or an area with many wireless devices, etc.).

At block 808, availability information is sent. In some embodiments, a device may indicate that it is available and able to act (e.g., volunteered) as a service enhancer.

At block 810, testing data is received and is used to evaluate the usefulness of one or more volunteered devices on a variety of metrics, including but not limited to, availability, capabilities, distance to devices that could benefit from enhanced service, and security measures, etc.

At block 812, a response to the testing data is sent. The response may include the capabilities, signal strength, distance to other devices, and security measures, etc., of the device that has been volunteered to act as a service enhancer.

At block 814, an acknowledgement is received and may indicate that a network component (e.g., base station) has accepted a user equipment to act as a service enhancer. The network sends an acknowledgment to the service enhancer acknowledging that the service enhancer will be functioning in the network at a service enhancer. For example, the network may acknowledge the service enhancer as not being a cellular telephone but rather is a device that will provide service to one or more cell phones.

At block 816, information associated with a client set is optionally sent. The service enhancer may send a closed client set or a discovered set of neighboring devices to the network. For example, the service enhancer may report that there are five cell phones or laptops proximately located relative to the service enhancer and the service enhancer may report unique identifiers (e.g., mobile equipment identifier (MEID)) associated with each device. The service enhancer may further report that the five cell phones or laptops currently have weak or no network signal and that the service enhancer will be able to provide improved service access to each of the devices. The service enhancer is able to determine, independent of the network, that it has a strong signal channel to the five cell phones or laptops, while five cell phones or laptops have a weak signal channel to the network.

At block 818, configuration information is received. The configuration information is received by a service enhancer from a base station or other part of the network which includes the frequency band and coding scheme that will be used to send data from the base station to the service enhancer. The base station, network, etc., may send the service enhancer a unique identifier (ID) so that the service enhancer can be recognized in the future.

At block 820, service enhancer and client links are setup. The service enhancer sends frequency band and coding scheme architecture to client devices that will be used to communicate with one or more clients. The clients may receive the frequency band and coding scheme information and acknowledge the information thereby allowing the service enhancer and client links to be established.

At block 822, information associated with the service enhancer and the client links is sent. The information associated with the service enhancer and the client links may include one or more indicators of the links established between the service enhancer and the clients. The information associated with the service enhancer and client links is sent to the network.

At block 824, data is communicated. Downlink data is communicated from the base station through the service enhancer to a client. Uplink data from a client is communicated from a client to the base station through the service enhancer. The data is processed by the service enhancer prior to sending to a client and to the network.

The base station may provide a respective indicator for each portion of data that will go to respective devices that are receiving data from the service enhancer. The device acting as the service enhancer sends one or more messages including its unique identifier and communication scheme (e.g., frequency band, transmission scheme, etc.) to each of the devices receiving service via the service enhancer. In some embodiments, a handshaking process is performed to setup the communication between the device acting as a service enhancer and the one or more devices getting service therefrom. In some embodiments, two devices that are performing service enhancer functions may communicate with each other via device-to-device (D2D) communication.

Figure 9:
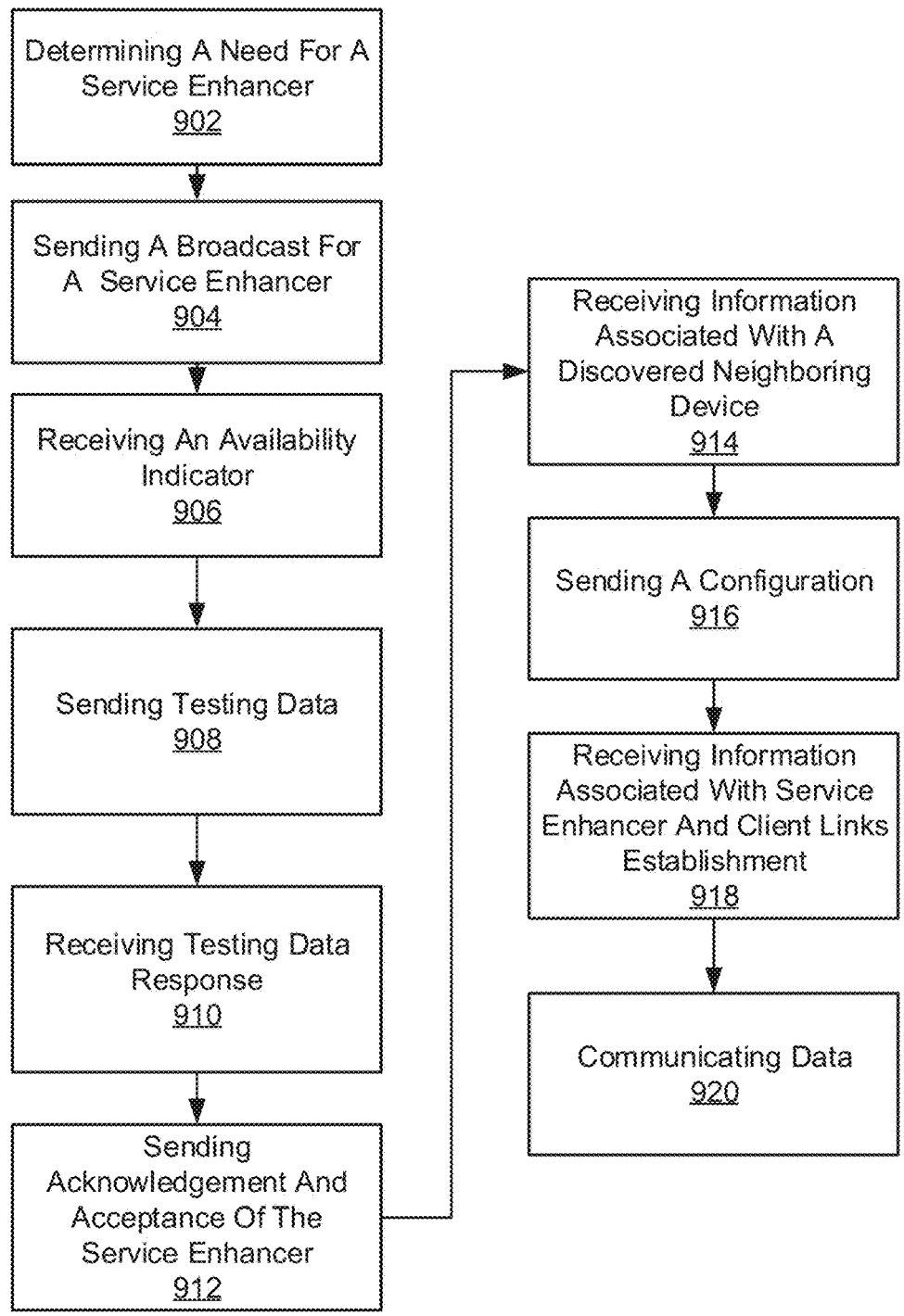
FIG. 9 shows an exemplary process performed by a network component during setup of a device volunteered to function as a service enhancer device, in accordance with embodiments of the present invention.

FIG. 9 shows an exemplary process 900 performed by a network component during setup of a device volunteered to function as a service enhancer, in accordance with an embodiment of the present invention. Process 900 is performed by a base station or other network component during the setup of a user equipment as a service enhancer. The process 900 is generally performed in conjunction with a user's smart phone, cell phone, laptop, tablet, etc., performing process 800 and the setup can be network assisted or network independent.

At block 902, a need for a service enhancer is determined, e.g., in accordance with the description of block 702.

At block 904, an indicator for a service enhancer is sent. The indicator can be sent to a system including a graphical user interface to allow an operator to be informed of the need for a service enhancer, the location where the service enhancer is needed, etc.

At block 906, an availability indicator is received. The availability indicator is received from a device and indicates that the device is available and able (e.g., has been volunteered) to act as a service enhancer.

At block 908, testing data is sent. The testing data is used to evaluate the usefulness of one or more volunteered devices on a variety of metrics, including but not limited to, good access, capabilities (e.g., processing power, supported methods of communication, etc.), distance to devices that could benefit from enhanced service, and security measures (e.g., that security measures are up to date), etc.

At block 910, a response to the testing data is received. The response to the testing data may include the capabilities, signal strength, distance to other device, security measures, etc., of the device that has been volunteered to act as a service enhancer.

At block 912, an acknowledgement and acceptance of the service enhancer is sent. In some embodiments, a network component may select among the available devices that have been volunteered to act as a service enhancer (e.g., based on the response to the testing data for particular device). The acknowledgement and acceptance of the service enhancer are sent to the selected device that was volunteered to act as a service enhancer. For example, if two devices that have been volunteered to act as a service enhancer are close to a set of devices in need of service enhancement, the network may select one of the two devices that have been volunteered to act as a service enhancer.

At block 914, information associated with a client set is received. The information may include identifiers of one or more devices (e.g., devices near the service enhancer) client set of the service enhancer.

At block 916, configuration information is sent. The configuration information is determined by one or more network components and includes configuration information for the service enhancer to use in communicating with a base station or other network components.

At block 918, information associated with link establishment is received. The information associated with link establishment may include information associated with links between a service enhancer and one or more clients.

At block 920, data is communicated to the service enhancer and the client. In some embodiments, control plane information is communicated directly to the client while other data communications are communicated to the client through the service enhancer.

Figure 10:
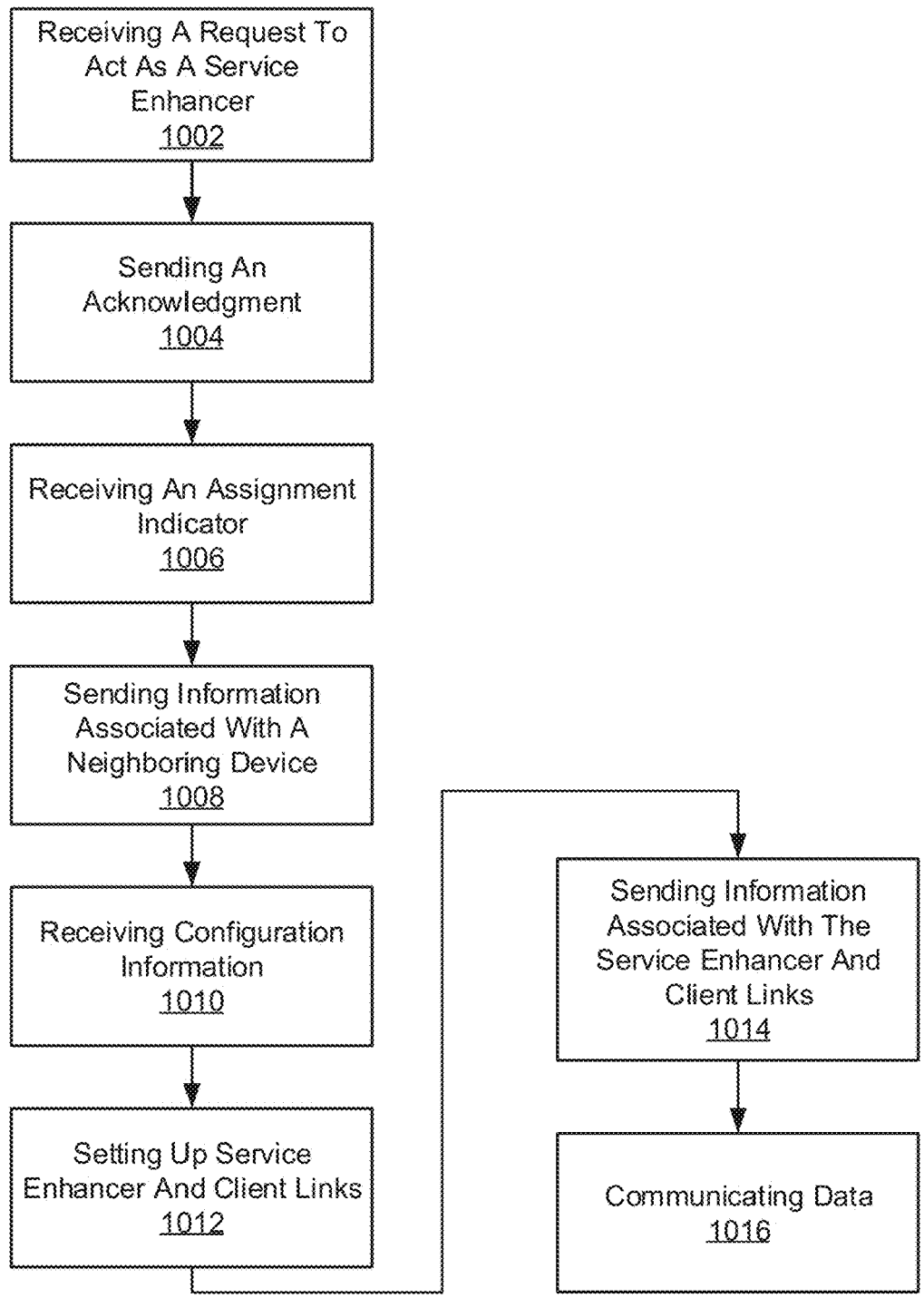
FIG. 10 shows an exemplary setup process of a device assigned by the network to function as a service enhancer device, in accordance with embodiments of the present invention.

FIG. 10 shows an exemplary setup process 1000 of a device assigned by the network to function as a service enhancer, in accordance with an embodiment of the present invention. Process 1000 is performed by device that has been assigned to function as a service enhancer (e.g., the service enhancer 104) by a network component (e.g., base station 102) and is going to join a network to enhance service for one or more pieces of user equipment or devices. The process 1000 can be performed by a user's smart phone, cell phone, laptop, tablet, etc., and the setup can be network assisted or network independent.

At block 1002, a request to act as a service enhancer is received. The request is received at a device that has capabilities determined by one or more network components to be sufficient to act as a service enhancer. In some embodiments, a device may receive a request to act as a service enhancer based on the service enhancer being in an identified region (e.g., a deadzone, near a deadzone, or an area with many wireless devices, etc.).

At block 1004, an acknowledgment is sent to one or more network components and includes an indicator that the device is available to act as a service enhancer.

At block 1006, an assignment indicator is received. The assignment indicator may indicate that a device has been selected to be assigned to function as a service enhancer.

At block 1008, information associated with a client set is optionally sent. The service enhancer may send a closed client set or a discovered set of neighboring devices to the network. For example, the service enhancer may report that there are five cell phones or laptops proximately located relative to the service enhancer and the service enhancer may report unique identifiers (e.g., mobile equipment identifier (MEID)) associated with each device. The service enhancer may further report that the five cell phones or laptops currently have weak or no network signal and that the service enhancer will be able to provide improved service access to each of the devices. The service enhancer is able to determine, independent of the network, that the service enhancer has a strong signal channel to the five cell phones or laptops, while five cell phones or laptops have a weak signal channel to the network.

At block 1010, configuration information is received. The configuration information is received by a service enhancer from a base station or other part of the network which includes the frequency band and coding scheme that will be used to send data from the base station to the service enhancer. The base station, network, etc., may send the service enhancer a unique identifier (ID) so that the service enhancer can be recognized in the future.

At block 1012, service enhancer and client links are setup. The service enhancer sends frequency band and coding scheme architecture to client device (e.g., TUEs, the computing devices 116-118, etc.) that will be used to communicate with one or more clients (e.g., cell phones, laptops, tablets, etc.). The clients may receive the frequency band and coding scheme information and acknowledge the information thereby allowing the service enhancer and client links to be established.

At block 1014, information associated with the service enhancer and the client links is sent. The information associated with the service enhancer and the client links may include one or more indicators of the links established between the service enhancer and the clients. The information associated with the service enhancer and the client links is sent to the network (e.g., base station).

At block 1016, data is communicated. Downlink data may communicate from the base station through the service enhancer to a client. Uplink data from a client is communicated from a client to the base station through the service enhancer. The data is processed (e.g., decoded, transformed, etc.) by the service enhancer prior to sending to a client and to the network.

The base station may provide a respective indicator for each portion of data that will go to respective devices that are receiving data from the service enhancer. The device acting as the service enhancer sends one or more messages including its unique identifier and communication scheme (e.g., frequency band, transmission scheme, etc.) to each of the devices receiving service via the service enhancer. In some embodiments, a handshaking process is performed to setup the communication between the device acting as a service enhancer and the one or more devices getting service from the service enhancer. In some embodiments, two devices that are performing service enhancer functions may communicate with each other via device-to-device (D2D) communication.

Figure 11:
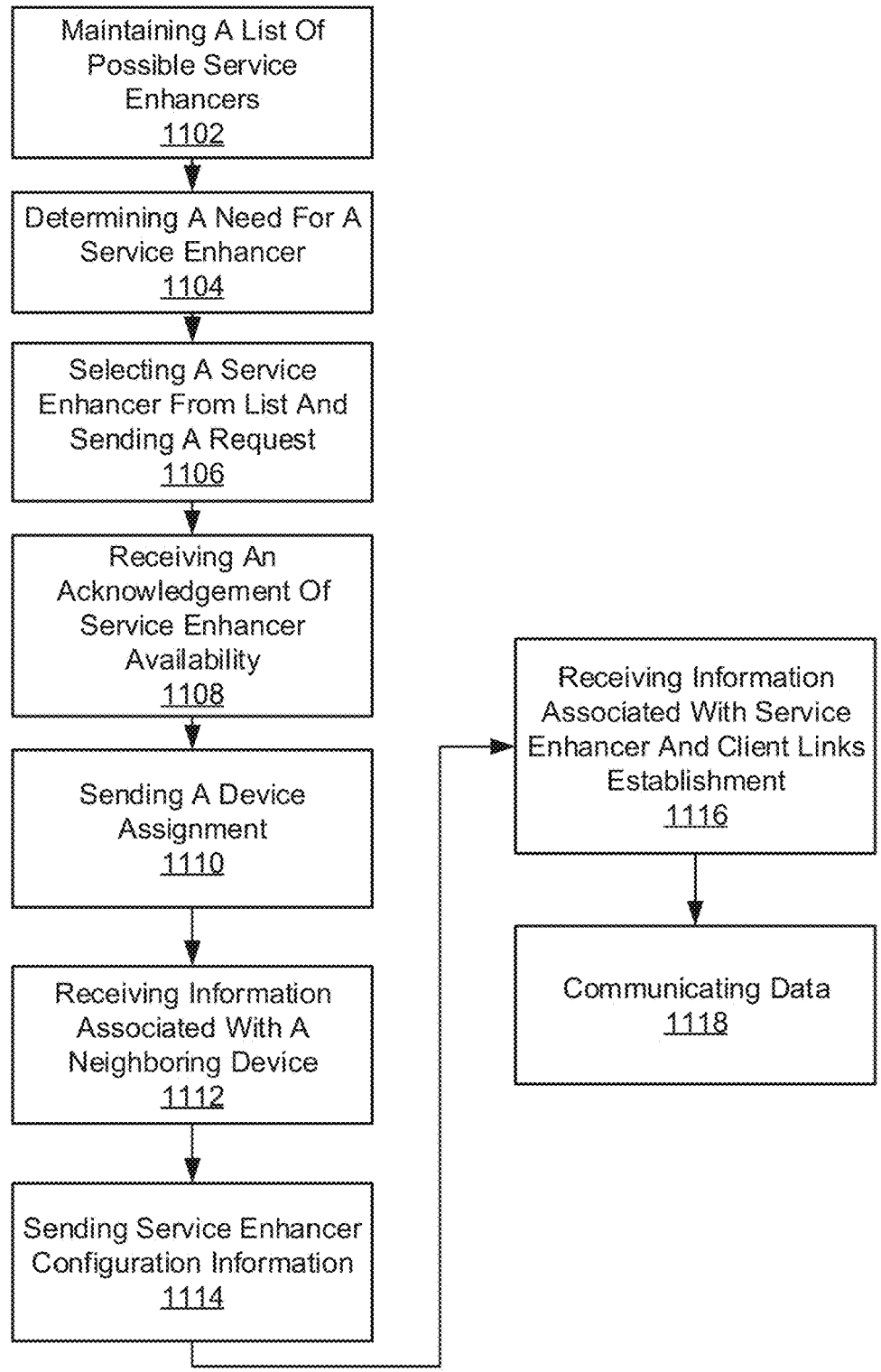
FIG. 11 shows an exemplary process performed by a network component during setup of a device assigned by the network to function as a service enhancer device, in accordance with embodiments of the present invention.

FIG. 11 shows an exemplary process 1100 performed by a network component during setup of a device assigned by the network to function as a service enhancer, in accordance with an embodiment of the present invention. Process 1100 is performed by a base station (e.g., base station 102) or other network component (e.g., backbone server, backhaul server, wireless device, etc.) during the setup and assignment of a piece of user equipment to function as a service enhancer (e.g., the service enhancer 104). The process 1100 is generally performed in conjunction with a user's smart phone, cell phone, laptop, tablet, etc., performing process 1000 and the setup can be network assisted or network independent.

At block 1102, a list of possible service enhancers is maintained. In some embodiments, one or more network components may maintain a list of potential temporary devices that can act as service enhancers. For example, one or more network components may track user equipment with strong signal connections, capabilities, location, etc.

At block 1104, a need for a service enhancer is determined in accordance with the description of block 702.

At block 1106, a device to act as a service enhancer is selected and a request is sent to the device. In some embodiments, one or more devices are selected based on location, connection signal strength, and capabilities, etc., as described herein.

At block 1108, an acknowledgement of service enhancer availability is received. The acknowledgment may indicate that the device is available to act as a service enhancer in response to the request.

At block 1110, a device assignment is sent to the device assigned to function as a service enhancer and includes an indication that the device has been assigned to function as a service enhancer.

At block 1112, information associated with a client set is received. The information may include identifiers of one or more devices (e.g., devices near the service enhancer) as the client set of the service enhancer.

At block 1114, configuration information is sent and is determined by one or more network components and includes information for the service enhancer to use in communicating with a base station or other network components.

At block 1116, information associated with link establishment is received. The information associated with link establishment may include information associated with links between a service enhancer and one or more clients.

At block 1118, data is communicated to the service enhancer and the client. In some embodiments, control plane information is communicated directly to the client while other data communications are communicated to the client through the service enhancer.

Figure 12:
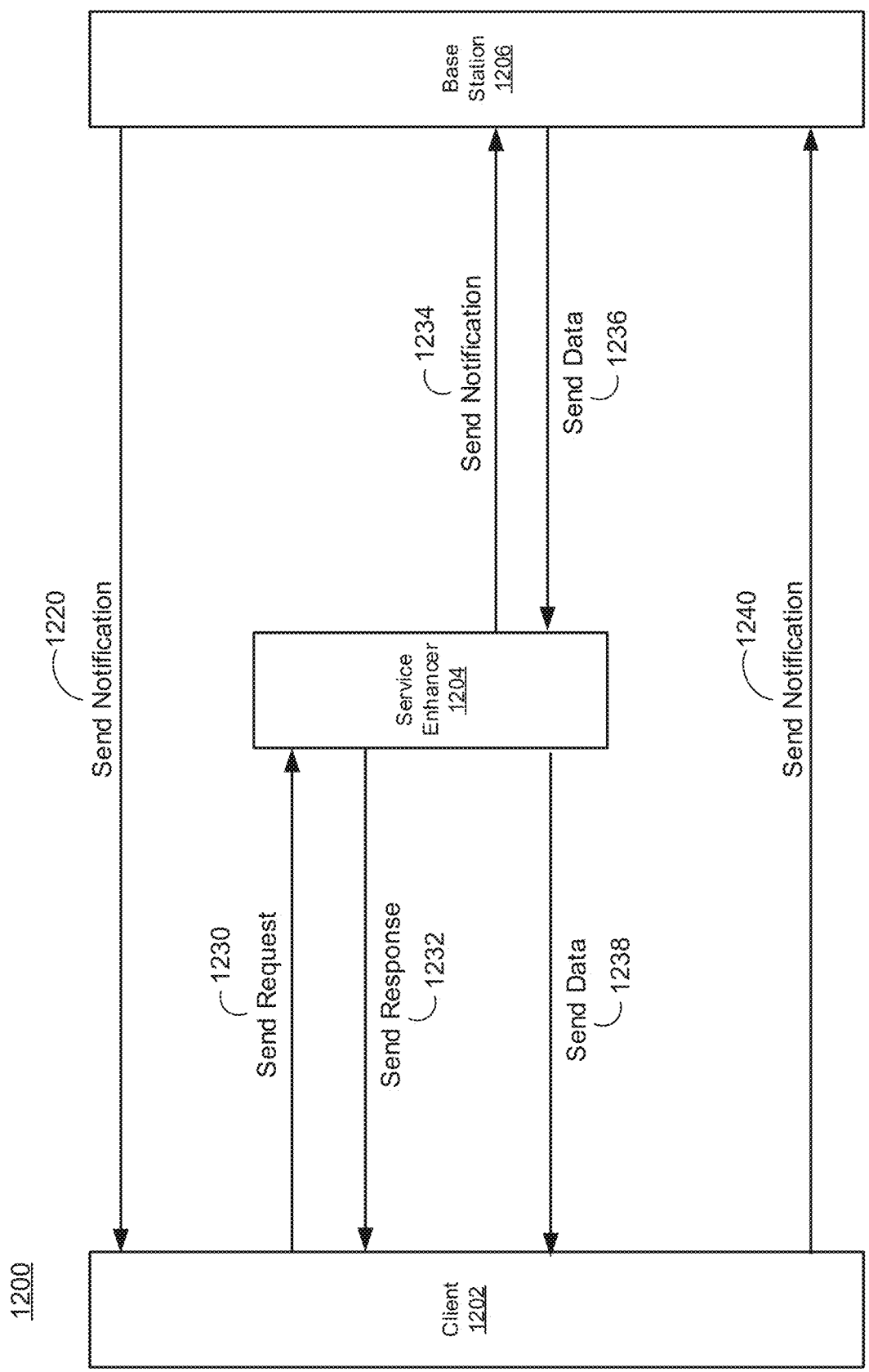
FIG. 12 shows exemplary communications associated with network assisted service enhancer discovery and offloading processes, in accordance with various embodiments.

FIG. 12 shows exemplary communication signals associated with network assisted service enhancer discovery and offloading processes in accordance with various embodiments of the present invention. Exemplary communications diagram 1200 includes a client 1202 (e.g., the computing device 116, the computing device 118, etc.), a service enhancer 1204 (e.g., the service enhancer 104), and a base station 1206 (e.g., the base station 102). FIG. 12 depicts exemplary communications between the client 1202, the service enhancer 1204, and the base station 1206. The client 1202 can be a device having wireless connectivity (e.g., smart phone, cell phone, laptop, tablet, etc.) that has a limited signal strength when communicating over a network associated with base station 1206. The service enhancer 1204 is a specialized device configured for expanding service that has been volunteered as described herein.

The base station 1206 sends notification 1220 to client 1202. The notification 1220 may include an indicator of the presence of the service enhancer 1204 in the vicinity of the client 1202 and/or a request that the client 1202 offload communications (e.g., user plane communication) to the service enhancer 1204. The client 1202 may then send request 1230 to the service enhancer 1204 to provide service (e.g., data communications) to the client 1202. The service enhancer 1204 may then send response 1232 including an indication of acceptance to provide service to the client 1202. The service enhancer 1204 may then optionally send a notification 1234 to base station 1206 requesting that communications be offloaded to the service enhancer 1204 and also requesting that data for the client 1202 be sent to the service enhancer 1204. The client 1202 may optionally send notification 1240 to the base station 1206 requesting communications offload to the service enhancer 1204 and requesting that data for the client 1202 be sent to the service enhancer 1204. The base station 1206 may then send data 1236 (for client 1202) to the service enhancer 1204. The service enhancer 1204 then sends data 1236 (as data 1238) to client 1202. The service enhancer 1204 may modify (e.g., re-encode) data 1236 for sending to the client 1202.

The client 1202 is subscribed to the base station 1206. The base station 1206 sends control plane information for the client 1202 to both the service enhancer 1204 and the client 1202. The service enhancer 1204 may send only data to the client 1202.

Figure 13:
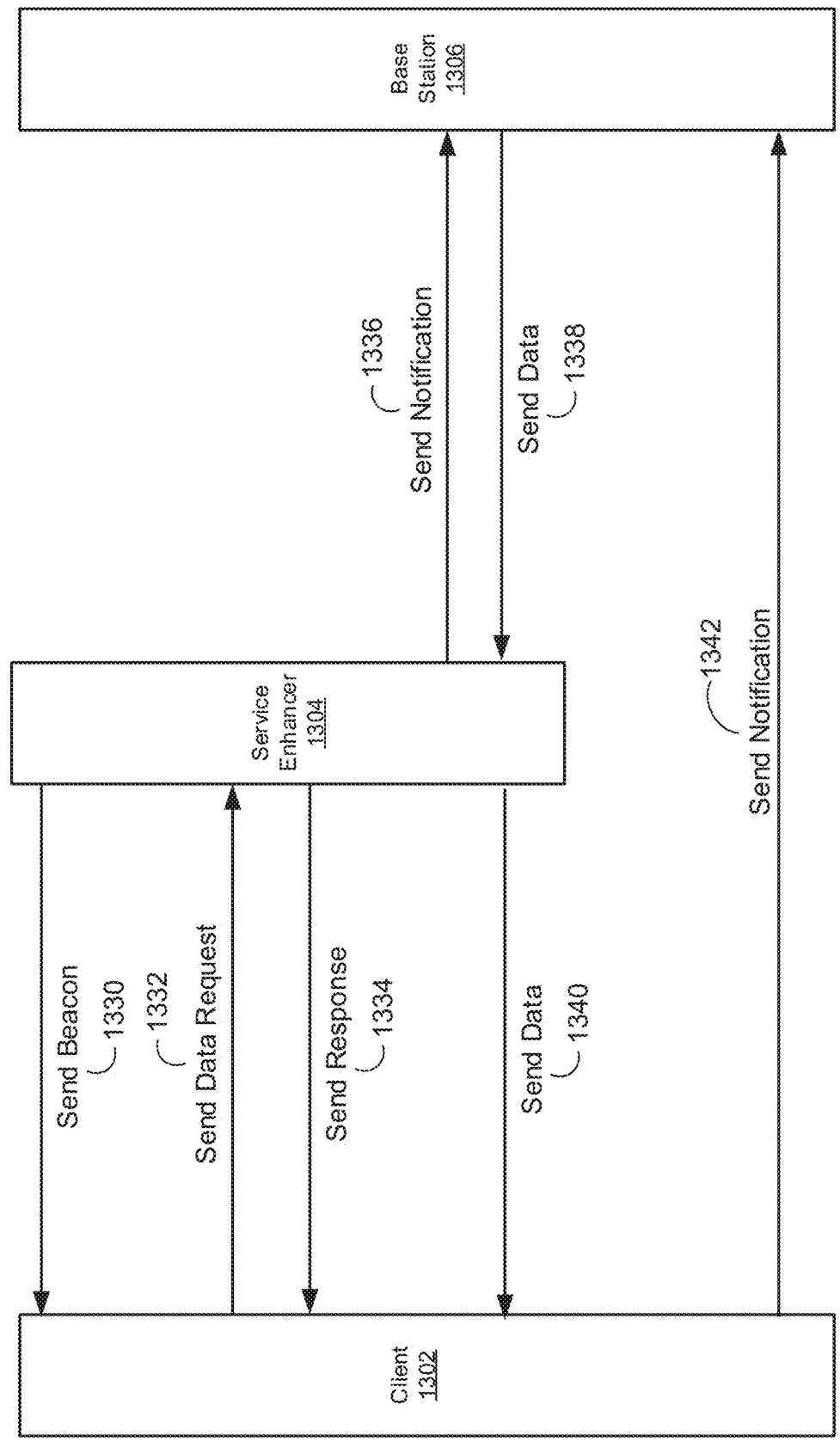
FIG. 13 shows exemplary communications associated with network independent service enhancer discovery and offloading processes, in accordance with embodiments of the present invention.

FIG. 13 shows exemplary communications associated with network independent service enhancer discovery and offloading processes, in accordance with various embodiments. Exemplary communications diagram 1300 includes a client 1302 (e.g., the computing device 116, the computing device 118, etc.), a service enhancer 1304 (e.g., the service enhancer 104), and a base station 1306 (e.g., base station 102). FIG. 13 depicts exemplary communications between the client 1302, the service enhancer 1304, and the base station 1306. The client 1302 is a device with wireless connectivity (e.g., smart phone, cell phone, laptop, tablet, etc.) that has a limited signal and communication strength with a network associated with base station 1306. The service enhancer 1304 is a specialized device configured for expanding service that has been volunteered.

The service enhancer 1304 sends beacon 1330 to the client 1302. The beacon 1330 includes an indicator that the service enhancer 1304 is available to provide service (e.g., improved communications) to devices proximately located near the service enhancer 1304. The client 1302 identifies the beacon 1330 and determines whether to respond to the beacon 1330 and the associated response (e.g., accepting or rejecting the opportunity to receive data via the service enhancer 1304). The client 1302 may then send request 1332 which requests data for the client 1302 be sent from the service enhancer 1304.

The service enhancer may then send response 1332 including an indication of acceptance of the request 1330. The service enhancer 1304 then sends response 1334 accepting the request from client 1302. The service enhancer 1304 may then optionally send notification 1336 to base station 1306 requesting the offloading of communications to the service enhancer 1304 and requesting that data for the client 1302 be sent to the service enhancer 1304. The client 1302 may optionally send notification 1342 to base station 1306 requesting the offloading of communications to the service enhancer 1304 and requesting that data for the client 1302 be sent to the service enhancer 1304. The base station 1306 may then send data 1338 (which is for client 1302) to the service enhancer 1304. The service enhancer 1304 then sends data 1338 (as data 1340) to client 1302. The service enhancer 1304 may modify (e.g., re-encode) data 1338 for sending to the client 1302.

The client 1302 is subscribed to the base station 1306. The service enhancer 1304 discovery process is performed at the client 1302 independently from the base station 1306. The control plane and user plane information from the base station 1306 is received at the client 1302 from the service enhancer 1304 which receives the control plane and the user plane from the base station 1306.

Figure 14:
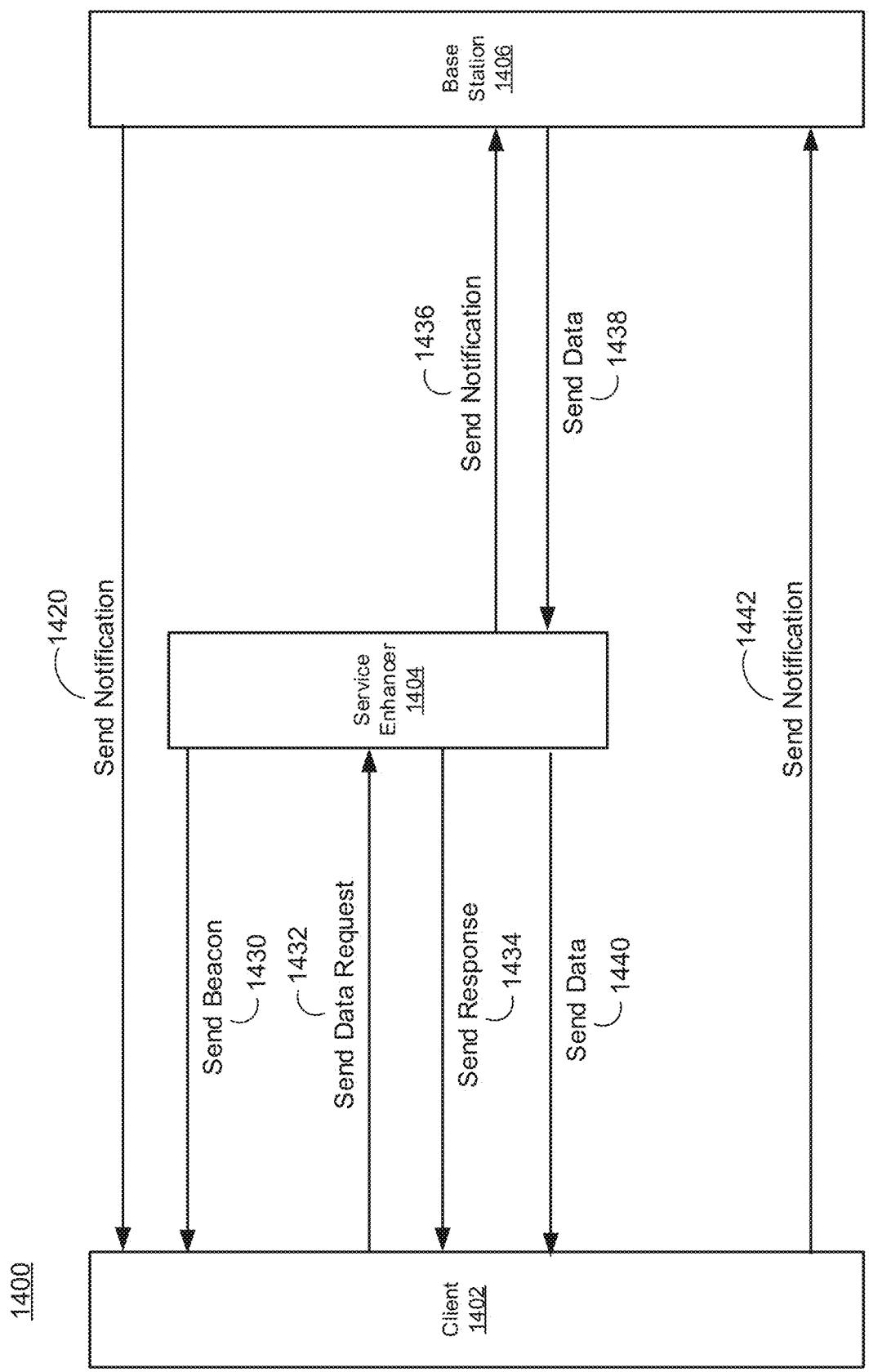
FIG. 14 shows exemplary communications associated with network assisted service enhancer discovery and offloading processes, in accordance with embodiments of the present invention.

FIG. 14 shows exemplary communications associated with network assisted service enhancer discovery and offloading processes, in accordance with various embodiments. Exemplary communications diagram 1400 includes a client 1402 (e.g., the computing device 116, the computing device 118, etc.), a service enhancer 1404 (e.g., the service enhancer 104), and a base station 1406 (e.g., base station 102). FIG. 14 depicts exemplary communications between the client 1402, the service enhancer 1404, and the base station 1406 during network assisted discovery and user plane offloading to service enhancer 1404. The client 1402 is a device with wireless connectivity (e.g., smart phone, cell phone, laptop, tablet, etc.) that has a limited signal and communication strength over a network associated with the base station 1404. The service enhancer 1404 is a specialized device configured for expanding service or a user's equipment that has been volunteered or assigned to function as a service enhancer, as described herein.

The base station 1406 sends notification 1420 to client 1402. The notification 1420 may include an indicator of the presence of the service enhancer 1404 in the vicinity of the client 1402. The service enhancer 1404 sends beacon 1430 to the client 1402. The beacon 1430 includes an indicator that the service enhancer 1404 is available to provide service (e.g., improved communications) to devices proximately located to the service enhancer 1404. The client 1402 identifies the beacon 1430 and determines whether to respond to the beacon 1430 and the associated response (e.g., accepting or rejecting the opportunity to receive data via the service enhancer 1404). The client 1402 may then send request 1432 which requests data for the client 1402 be sent from the service enhancer 1404.

The service enhancer may then send response 1434 including an indication of acceptance of the request 1432. The service enhancer 1404 may then optionally send notification 1436 to base station 1406 requesting the offloading of communications to the service enhancer 1404 and requesting that data for the client 1402 be sent to the service enhancer 1404. The client 1402 may optionally send notification 1442 to base station 1406 requesting the offloading of communications to the service enhancer 1404 and requesting that data for the client 1402 be sent to the service enhancer 1404. The base station 1406 may then send data 1438 (which is for client 1402) to the service enhancer 1404. The service enhancer 1404 then sends data 1438 (as data 1440) to client 1402. The service enhancer 1404 may modify (e.g., re-encode) data 1438 for sending to the client 1402.

The client 1402 is subscribed to the base station 1406. The base station 1406 sends control plane and user plane information that is received at the service enhancer 1404. The service enhancer 1404 may override the control plane and send both the user plane and the control plane to the client 1402.

Figure 15:
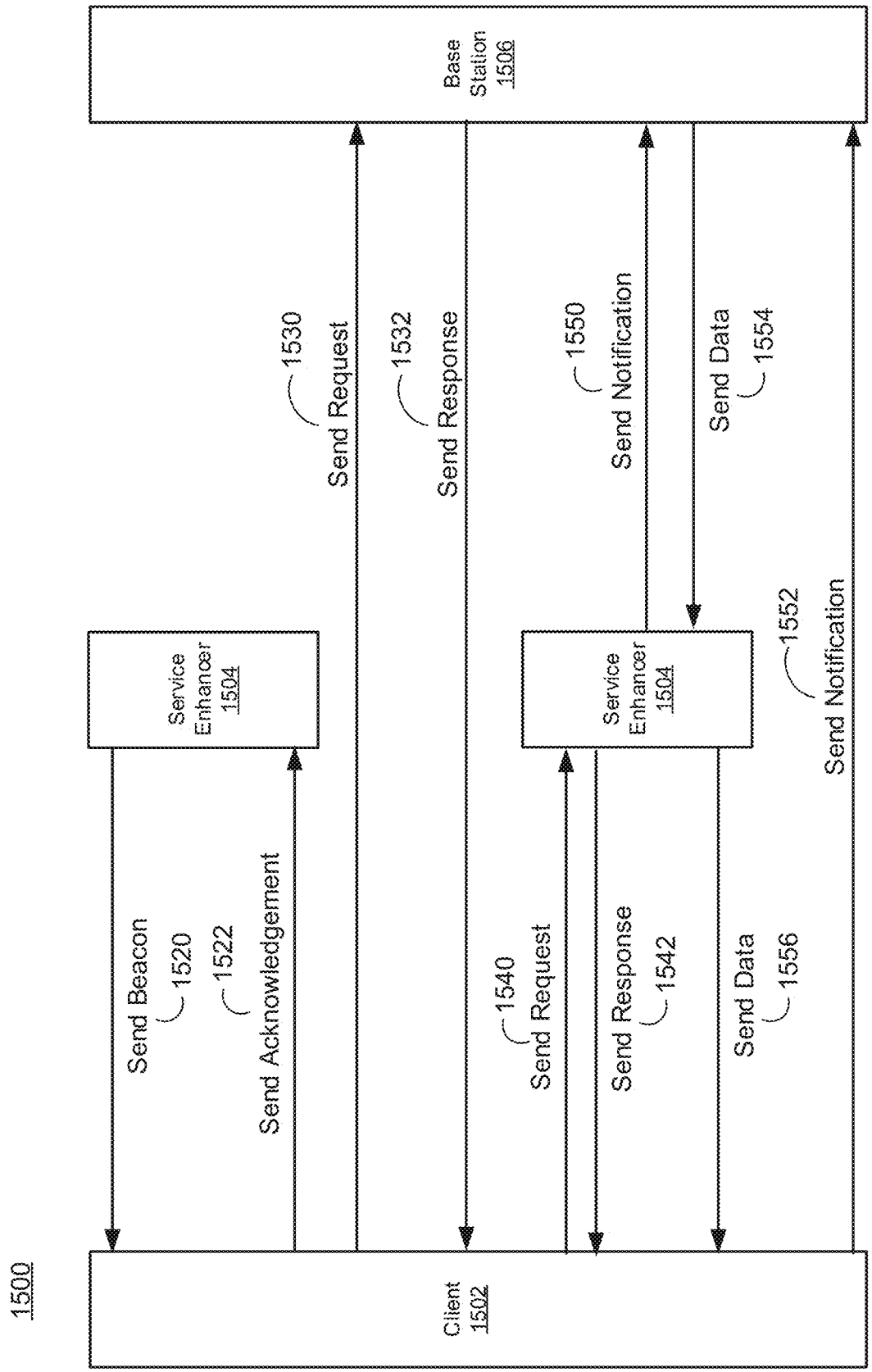
FIG. 15 shows exemplary communications associated with network independent service enhancer discovery and offloading processes, in accordance with embodiments of the present invention.

FIG. 15 shows exemplary communications associated with network independent service enhancer discovery and offloading processes, in accordance with various embodiments. Exemplary communications diagram 1500 includes a client 1502 (e.g., the computing device 116, the computing device 118, etc.), a service enhancer 1504 (e.g., the service enhancer 104), and a base station 1506 (e.g., base station 102). FIG. 15 depicts exemplary communications between the client 1502, the service enhancer 1504, and the base station 1506 during network independent discovery and user plane offloading to service enhancer 1504. The client 1502 is a device with wireless connectivity (e.g., smart phone, cell phone, laptop, tablet, etc.) that has a limited signal and communication strength over a network associated with base station 1506. The service enhancer 1504 is a specialized device configured for expanding service or a user's equipment that has been volunteered or assigned to function as a service enhancer, as described herein.

The service enhancer 1504 sends beacon 1520 to the client 1502. The beacon 1520 includes an indicator that the service enhancer 1504 is available to provide service (e.g., communications) to devices proximately located to the service enhancer 1504. The client 1502 identifies the beacon 1520 and determines whether to respond to the beacon 1520 and the associated response (e.g., accepting or rejecting the opportunity to receive data via the service enhancer 1504). The client 1502 may then send acknowledgment 1522 which acknowledges to service enhancer 1504 that the client 1502 would like to receive service (e.g., data) from the service enhancer 1504.

The client 1502 may then send request 1530 to base station 1506. The request 1530 is a request for permission, from the base station 1506, to receive data from the service enhancer 1504. The base station 1506 may make a determination based on the capabilities of the service enhancer 1504, as described herein. The determination by the base station 1506 is based on a determination by one or more network components (e.g., backbone, servers, etc.). The base station 1506 may then send an indicator granting or denying permission. If the base station 1506 grants permission, response 1532 is sent to the client 1502 with an indicator that the base station 1506 grants the client 1502 permission to use the service enhancer 1504 for service (e.g., data communications).

The client 1502 may then send request 1540 which requests data for the client 1502 be sent from the service enhancer 1504. The service enhancer 1504 may then send response 1542 including an indication of acceptance of the request 1540. The service enhancer 1504 may then optionally send notification 1550 to base station 1506 requesting the offloading of communications with the client 1502 to the service enhancer 1504 and requesting that data for the client 1502 be sent to the service enhancer 1504. The client 1502 may optionally send notification 1552 to base station 1506 requesting the offloading of communications to the service enhancer 1504 and requesting that data for the client 1502 be sent to the service enhancer 1504. The base station 1506 may then data 1554 (which is for client 1502) to the service enhancer 1504. The service enhancer 1504 then sends data 1554 (as data 1556) to client 1502. The service enhancer 1504 may modify (e.g., re-encode) data 1554 for sending to the client 1502.

The client 1502 is subscribed to the base station 1506. The base station 1506 assists the client 1502 in discovery of the service enhancer 1504 and offloading of the user plane to the service enhancer 1504. The control plane and the user plane of the client 1502 come from the service enhancer 1506.

Referring now to FIG. 16, a block diagram of a computer system platform in accordance with embodiments of the present invention is shown. With reference to FIG. 16, an example system module for implementing embodiments disclosed above, such as those described in FIGS. 1-15. The system includes a general purpose computing system environment, such as computing system environment 1600. The computing system environment 1600 may include servers, desktop computers, laptops, tablets, mobile devices, and smartphones, etc. The computing system environment 1600 typically includes at least one processing unit 1602 and computer readable storage medium 1604. Depending on the exact configuration and type of computing system environment, computer readable storage medium 1604 is volatile (such as RAM), non-volatile (such as ROM, flash memory, etc.) or some combination of the two. Portions of computer readable storage medium 1604 when executed may perform method of enhancing network coverage using service enhancer devices, as described herein.

Additionally in various embodiments, the computing system environment 1600 may also have other features/functionalities. For example, the computing system environment 1600 may also include additional storage (removable and/or non-removable) including, but not limited to, magnetic or optical disks or tape. Such additional storage is illustrated by removable storage 1608 and non-removable storage 1610. Computer storage media includes volatile and nonvolatile, removable and non-removable media implemented in any method or technology for storage of information such as computer readable instructions, data structures, program modules or other data. Computer readable medium 1604, removable storage 1608 and nonremovable storage 1610 are all examples of computer storage media. Computer storage media includes, but is not limited to, RAM, ROM, EEPROM, flash memory or other memory technology, expandable memory (e.g. USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by the computing system environment 1600. Any such computer storage media is part of the computing system environment 1600.

The computing system environment 1600 may also contain communications connection(s) 1612 that allow it to communicate with other devices. Communications connection(s) 1612 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Communications connection(s) 1612 may allow the computing system environment 1600 to communicate over various networks types including, but not limited to, fibre channel, small computer system interface (SCSI), Bluetooth, Ethernet, Wi-Fi, Infrared Data Association (IrDA), Local area networks (LAN), Wireless Local area networks (WLAN), wide area networks (WAN) such as the internet, serial, and universal serial bus (USB). It is appreciated the various network types that the communication connection(s) 1612 connect to may run a plurality of network protocols including transmission control protocol (TCP), user datagram protocol (UDP), Internet Protocol (IP), real-time transport protocol (RTP), real-time transport control protocol (RTCP), file transfer protocol (FTP), and hypertext transfer protocol (HTTP), etc.

In further embodiments, the computing system environment 1600 may also have input device(s) 1614 such as a keyboard, mouse, a terminal or terminal emulator (either directly connected or remotely accessible via telnet, SSH, HTTP, SSL, etc.), a pen, voice input device, touch input device, a remote control, etc. Output device(s) 2016 such as a display, a terminal or terminal emulator (either directly connected or remotely accessible via telnet, SSH, HTTP, SSL, etc.), speakers, LEDs, etc. may also be included.

The computer readable storage medium 1604 includes a service enhancer module 1620 and a network module 1650. The service enhancer module 1620 is configured for enhancing network service to one more devices as described herein. The network module 1650 is configured for operating in conjunction with the service enhancer module 1620 to setup and configure a device as a service enhancer, as described herein. The service enhancer module 1620 may be downloaded and installed to a device. The service enhancer module 1620 may execute on a device functioning as service enhancer. The network module 1650 may execute on a base station or other network component.

The service enhancer module 1620 includes a registration module 1622, a client set determination module 1624, a configuration module 1626, a link establishment module 1628, a communication module 1630, a volunteer module 1632, a testing module 1634, an availability module 1636, and an acceptance module 1636. The registration module 1622 is configured to facilitate registration of a service enhancer device as described herein. The client set determination module 1624 is configured for determining a client set for a service enhancer device, as described herein. The client set determination module 1624 may determine neighboring devices and send beacon messages, as described herein. The configuration module 1626 is configured for configuring a service enhancer (e.g., based on a configuration received from a network), as described herein.

The link establishment module 1628 is configured for establishing client, network, and service enhancer links, as described herein. The communication module 1630 is configured for sending data to and from the network (e.g., a base station) and one or more client devices (e.g., user equipment, computing devices, etc.), as described herein. The volunteer module 1632 is configured for allowing configuration of volunteer settings for a device functioning as a service enhancer and for communicating volunteer settings with the network, as described herein. The testing module 1634 is configured to receive and perform tests based on testing data received from a network, as described herein. The availability module 1636 is configured for communicating the availability of a device to function as a service enhancer, as described herein. The acceptance module 1636 is configured for accepting and implementing an assignment of a device to function as a service enhancer, as described herein.

The network module 1650 includes a registration module 1652, a need determination module 1654, a configuration determination module 1656, a storage module 1658, a communication module 1660, a control module 1662, an assignment module 1654, and a testing module 1656. The registration module 1652 is configured to facilitate registration of a service enhancer within a network, as described herein. The need determination module 1654 is configured for determining a need for a service enhancer in a network, as described herein. The configuration determination module 1656 is configured to determine a configuration for a service enhancer, as described herein. The storage module 1656 is configured for storing service enhancer client information, testing data, devices capable of functioning as a service enhancer, configuration data, etc., as described herein. The communication module 1660 is configured to allow a network component to communicate with a service enhancer, a device functioning as a service enhancer, and client devices, as described herein. The control module 1662 is configured for generating control plane information for clients of a service enhancer, as described herein. The assignment module 1654 is configured to assign service enhancement functions to a device, as described herein. The testing module 1656 is configured to send and process testing response data used to determine if a device will be permitted to function as a service enhancer, as described herein.

Referring now to FIG. 17, a block diagram of another computer system in accordance with some embodiments is shown. FIG. 17 depicts a block diagram of a computer system 1700 suitable for implementing embodiments of the present invention. Computer system 1700 includes a bus 1712 which connects the major subsystems of the computer system 1700, such as a central processor 1714, a system memory 1716 (typically RAM, but which may also include ROM, flash RAM, or the like), an input/output controller 1718, an external audio device, such as a speaker system 1720 via an audio output interface 1722, an external device, such as a display screen 1724 via a display adapter 1726, serial ports 1728 and 1730, a keyboard 1732 (interfaced with a keyboard controller 1733), a storage interface 1734, a floppy disk drive 1736 operative to receive a floppy disk 1738, a host bus adapter (HBA) interface card 1735A operative to connect with a Fibre Channel network 1760, a host bus adapter (HBA) interface card 1735B operative to connect to a Small Computer System Interface (SCSI) bus 1737, and an optical disk drive 1740 operative to receive an optical disk 1742. Also included are a mouse 1727 (or other point-and-click device, coupled to bus 1712 via serial port 1728), a modem 1746 (coupled to bus 1712 via serial port 1730), and a network interface 1748 (coupled directly to bus 1712).

It is appreciated that the network interface 1748 may include one or more Ethernet ports, wireless local area network (WLAN) interfaces, etc., but is not limited thereto. System memory 1716 includes a service enhancer module 1750, which is configured for sending, receiving, and translating communication between a network and one or more devices thereby enhancing service to the one or more devices, as described herein.

According to some embodiments, the communication module 1750 may include other modules for carrying out various tasks (e.g., modules of FIG. 16). It is appreciated that the service enhancer module 1750 is located anywhere in the system and is not limited to the system memory 1716. As such, residing within the system memory 1716 is merely an example and not intended to limit the scope of the embodiments. For example, parts of the service enhancer module 1750 is located within the central processor 1714 and/or the network interface 1748 but are not limited thereto.

The bus 1712 allows data communication between the central processor 1714 and the system memory 1716, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS), which controls basic hardware operation such as the interaction with peripheral components. Applications resident with computer system 1700 are generally stored on and accessed via a computer readable medium, such as a hard disk drive (e.g., fixed disk 1744), an optical drive (e.g., optical drive 1740), a floppy disk unit 1736, or other storage medium. Additionally, applications can be in the form of electronic signals modulated in accordance with the application and data communication technology when accessed via network modem 1746 or network interface 1748.

The storage interface 1734, as with the other storage interfaces of computer system 1700, can connect to a standard computer readable medium for storage and/or retrieval of information, such as a fixed disk drive 1744. A fixed disk drive 1744 is a part of computer system 1700 or is separate and accessed through other interface systems. The network interface 1748 may provide multiple connections to networked devices. Furthermore, a modem 1746 may provide a direct connection to a remote server via a telephone link or to the Internet via an Internet service provider (ISP). The network interface 1748 provides one or more connections to a data network, which may consist of any number of other network-connected devices. The network interface 1748 may provide such connection using wireless techniques, including digital cellular telephone connection, Cellular Digital Packet Data (CDPD) connection, digital satellite data connection or the like.

Many other devices or subsystems (not shown) is connected in a similar manner (e.g., document scanners, digital cameras and so on). Conversely, not all of the devices shown in FIG. 17 need to be present to practice the present disclosure. The devices and subsystems can be interconnected in different ways than shown in FIG. 17. Code to implement the present disclosure can be stored in computer-readable storage media such as one or more of system memory 1716, fixed disk 1744, optical disk 1742, or floppy disk 1738. The operating system provided on computer system 1700 is MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense

What is claimed is:

1. A method comprising:
sending, by a first apparatus to a base station, a registration request indicating capabilities of the first apparatus, the capabilities including at least one of: a frequency band, processing power of the first apparatus, a power source of the first apparatus, a power level of the first apparatus, or one or more transmission coding schemes;
receiving, by the first apparatus from the base station, an acknowledgment message to the registration request, the acknowledgement message acknowledging the first apparatus as a service enhancer;
receiving, by the first apparatus from the base station, user plane data, the user plane data intended for a second apparatus; and
sending, by the first apparatus to the second apparatus, the user plane data over a device-to-device (D2D) link,
wherein control plane information enabling decoding of the user plane data received from the base station is directly communicated from the base station to the second apparatus,
wherein the first apparatus and the second apparatus are registered to the base station, and
wherein the first apparatus is configured to provide enhanced wireless coverage to the second apparatus over wireless coverage provided by the base station.

2. The method of claim 1, further comprising:
receiving, by the first apparatus from the base station, configuration information, the configuration information including at least one of the frequency band or a coding scheme that will be used for receiving the user plane data.

3. The method of claim 1, further comprising:
sending, by the first apparatus to the base station, information associated with a client set to which the first apparatus will provide enhancement service, the client set including the second apparatus.

4. The method of claim 1, further comprising:
sending, by the first apparatus to the second apparatus, the frequency band and a coding scheme that will be used by the first apparatus to communicate with the second apparatus.

5. The method of claim 1, wherein the control plane information enabling the decoding of the user plane data is directly communicated from the base station over a control plane connection initiated by the base station.

6. A method comprising:
selecting, by a base station, a first user equipment (UE) based on at least one of a location of the first UE, connection signal strength of the first UE, or capabilities of the first UE;
sending, by the base station to the first UE, a device assignment indicating that the first UE has been assigned to function as a service enhancer;
sending, by the base station to the first UE, user plane data, the user plane data intended for a second UE; and
sending, by the base station to the second UE, control plane information enabling decoding of the user plane data, wherein the user plane data is sent from the first UE to the second UE over a device-to-device (D2D) link, wherein the first UE and the second UE are registered to the base station, and wherein the first UE is configured to provide enhanced wireless coverage to the second UE over wireless coverage provided by the base station.

7. The method of claim 6, further comprising:

receiving, by the base station from the first UE, a registration request indicating the capabilities of the first UE, the capabilities including at least one of: a frequency band, processing power of the first UE, a power source of the first UE, a power level of the first UE, or one or more transmission coding schemes.

8. The method of claim 6, further comprising:

sending, by the base station to the first UE, configuration information, the configuration information including at least one of a frequency band or a coding scheme that will be used for sending the user plane data.

9. The method of claim 6, further comprising:

receiving, by the base station from the first UE, information associated with a client set to which the first UE will provide enhancement service, the client set including the second UE.

10. The method of claim 6, wherein the control plane information enabling the decoding of the user plane data is directly communicated from the base station over a control plane connection initiated by the base station.

11. A first apparatus comprising:

at least one processor; and a non-transitory computer readable storage medium storing programming, the programming including instructions when executed by the at least one processor to:

send, to a base station, a registration request indicating capabilities of the first apparatus, the capabilities including at least one of: a frequency band, processing power of the first apparatus, a power source of the first apparatus, a power level of the first apparatus, or one or more transmission coding schemes;

receive, from the base station, an acknowledgment message to the registration request, the acknowledgement message acknowledging the first apparatus as a service enhancer;

receive, from the base station, user plane data, the user plane data intended for a second apparatus; and send, to the second apparatus, the user plane data over a device-to-device (D2D) link, wherein control plane information enabling decoding of the user plane data received from the base station is directly communicated from the base station to the second apparatus, wherein the first apparatus and the second apparatus are registered to the base station, and wherein the first apparatus is configured to provide enhanced wireless coverage to the second apparatus over wireless coverage provided by the base station.

12. The first apparatus of claim 11, the programming further including instructions when executed by the at least one processor to:

receive, from the base station, configuration information, the configuration information including at least one of the frequency band or a coding scheme that will be used for receiving the user plane data.

13. The first apparatus of claim 11, the programming further including instructions when executed by the at least one processor to:

send, to the base station, information associated with a client set to which the first apparatus will provide enhancement service, the client set including the second apparatus.

14. The first apparatus of claim 11, the programming further including instructions when executed by the at least one processor to:

send, to the second apparatus, the frequency band and a coding scheme that will be used by the first apparatus to communicate with the second apparatus.

15. The first apparatus of claim 11, wherein the control plane information enabling the decoding of the user plane data is directly communicated from the base station over a control plane connection initiated by the base station.

16. A base station comprising:

at least one processor; and a non-transitory computer readable storage medium storing programming, the programming including instructions when executed by the at least one processor to:

select a first user equipment (UE) based on at least one of a location of the first UE, connection signal strength of the first UE, or capabilities of the first UE;

send, to the first UE, a device assignment indicating that the first UE has been assigned to function as a service enhancer;

send, to the first UE, user plane data, the user plane data intended for a second UE; and send, to the second UE, control plane information enabling decoding of the user plane data, wherein the user plane data is sent from the first UE to the second UE over a device-to-device (D2D) link, wherein the first UE and the second UE are registered to the base station, and wherein the first UE is configured to provide enhanced wireless coverage to the second UE over wireless coverage provided by the base station.

17. The base station of claim 16, the programming further including instructions when executed by the at least one processor to:

receive, from the first UE, a registration request indicating the capabilities of the first UE, the capabilities including at least one of: a frequency band, processing power of the first UE, a power source of the first UE, a power level of the first UE, or one or more transmission coding schemes.

18. The base station of claim 16, the programming further including instructions when executed by the at least one processor to:

send, to the first UE, configuration information, the configuration information including at least one of a frequency band or a coding scheme that will be used for sending the user plane data.

19. The base station of claim 16, the programming further including instructions when executed by the at least one processor to:

receive, from the first UE, information associated with a client set to which the first UE will provide enhancement service, the client set including the second UE.

20. The base station of claim 16, wherein the control plane information enabling the decoding of the user plane data is directly communicated from the base station over a control plane connection initiated by the base station.

* * * * *